US006636874B1

(12) United States Patent
Douceur et al.

(10) Patent No.: US 6,636,874 B1
(45) Date of Patent: *Oct. 21, 2003

(54) GENERATION, VALIDATION AND RESERVATION OF REFERENCE HANDLES

(75) Inventors: John R. Douceur, Bellevue, WA (US); Yoram Bernet, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 380 days.

This patent is subject to a terminal disclaimer.

(21) Appl. No.: 09/608,351

(22) Filed: Jun. 29, 2000

Related U.S. Application Data

(63) Continuation-in-part of application No. 09/103,334, filed on Jun. 23, 1998, now Pat. No. 6,105,039.

(51) Int. Cl.[7] .............................................. G06F 17/30
(52) U.S. Cl. .......................... 707/201; 707/10; 707/100; 707/9; 709/225; 709/229; 711/150; 711/151; 711/152
(58) Field of Search ................................ 707/9, 2, 201, 707/100; 709/225, 229; 711/150, 151, 152

(56) References Cited

U.S. PATENT DOCUMENTS

| | | | | |
|---|---|---|---|---|
| 5,765,154 A | * | 6/1998 | Horikiri et al. | 707/10 |
| 5,870,464 A | * | 2/1999 | Brewster et al. | 379/219 |
| 5,995,964 A | * | 11/1999 | Hoshiina et al. | 707/6 |
| 6,542,926 B2 | * | 4/2003 | Zalewski et al. | 709/213 |

* cited by examiner

Primary Examiner—Jean R. Homere
(74) Attorney, Agent, or Firm—Lee & Hayes, PLLC

(57) ABSTRACT

The present described embodiments are embodied in a system and method for generating and validating reference handles for consumers requiring access to resources in a computer system. The system of the present described embodiments includes a resource manager having a handle administrator, a plurality of consumers, and a plurality of resources. The handle administrator includes an assignment routine, a release routine, and a dereference routine. The assignment routine issues new handles, the release routine releases handles that are no longer required (thus rendering the handle invalid), and the dereference routine dereferences handles into a pointer to a resource, which entails verifying that the handle is valid. Also included is an auxiliary sub-routine for managing used and unused records, an expansion sub-routine for efficiently expanding the handle database, a handle recycling sub-routine for recycling handles, a contraction sub-routine for efficiently contracting the handle database, a hysteresis sub-routine for probabilistically contracting the handle database, and a memory allocation failure sub-routine to improve functionality in the event of memory allocation failure. Further, the systems and methods include routines that enable a handle value to be reserved for an indication of a lack of a valid handle. The reserved handle value is never issued to a consumer for use in accessing a resource.

45 Claims, 16 Drawing Sheets

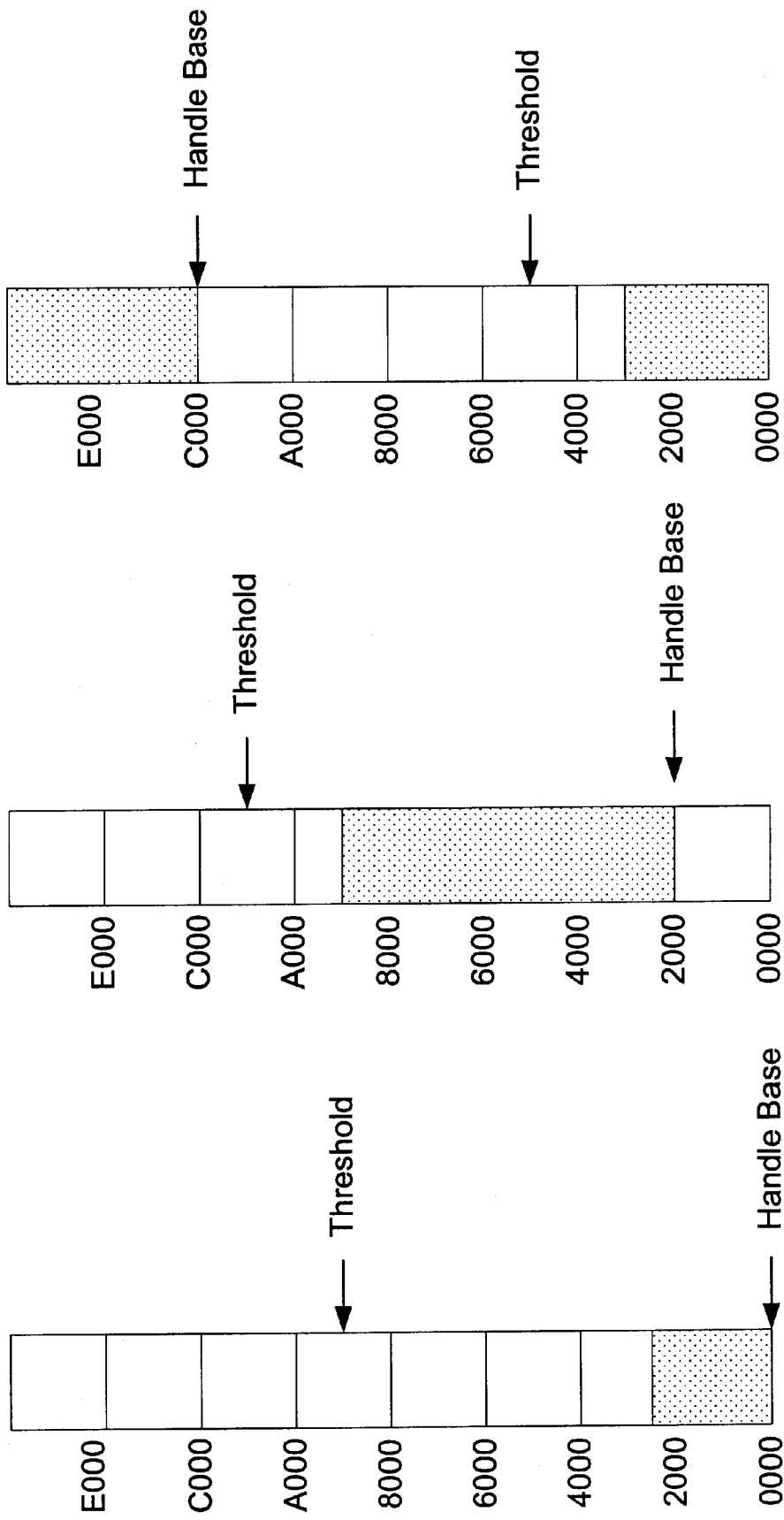

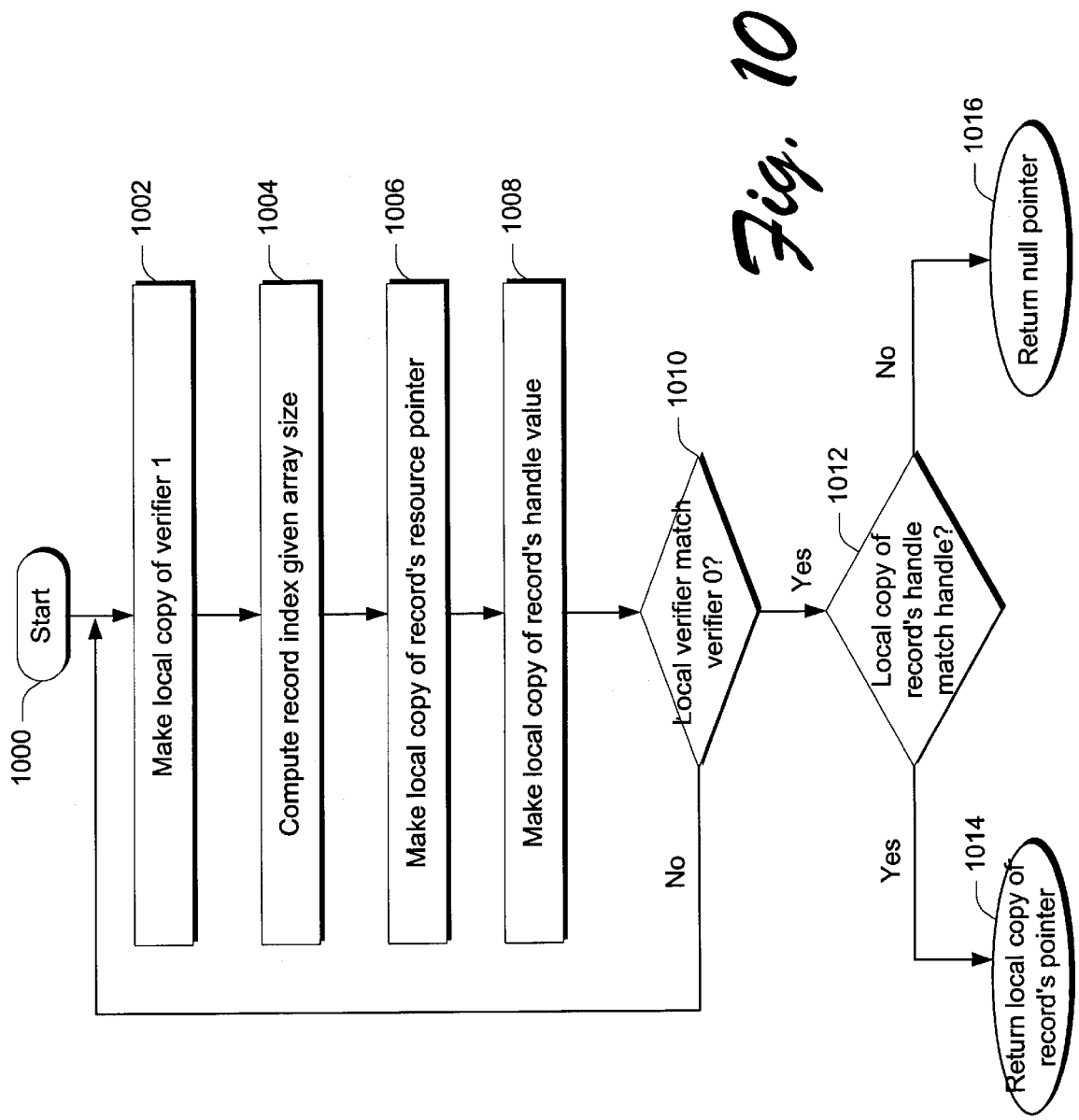

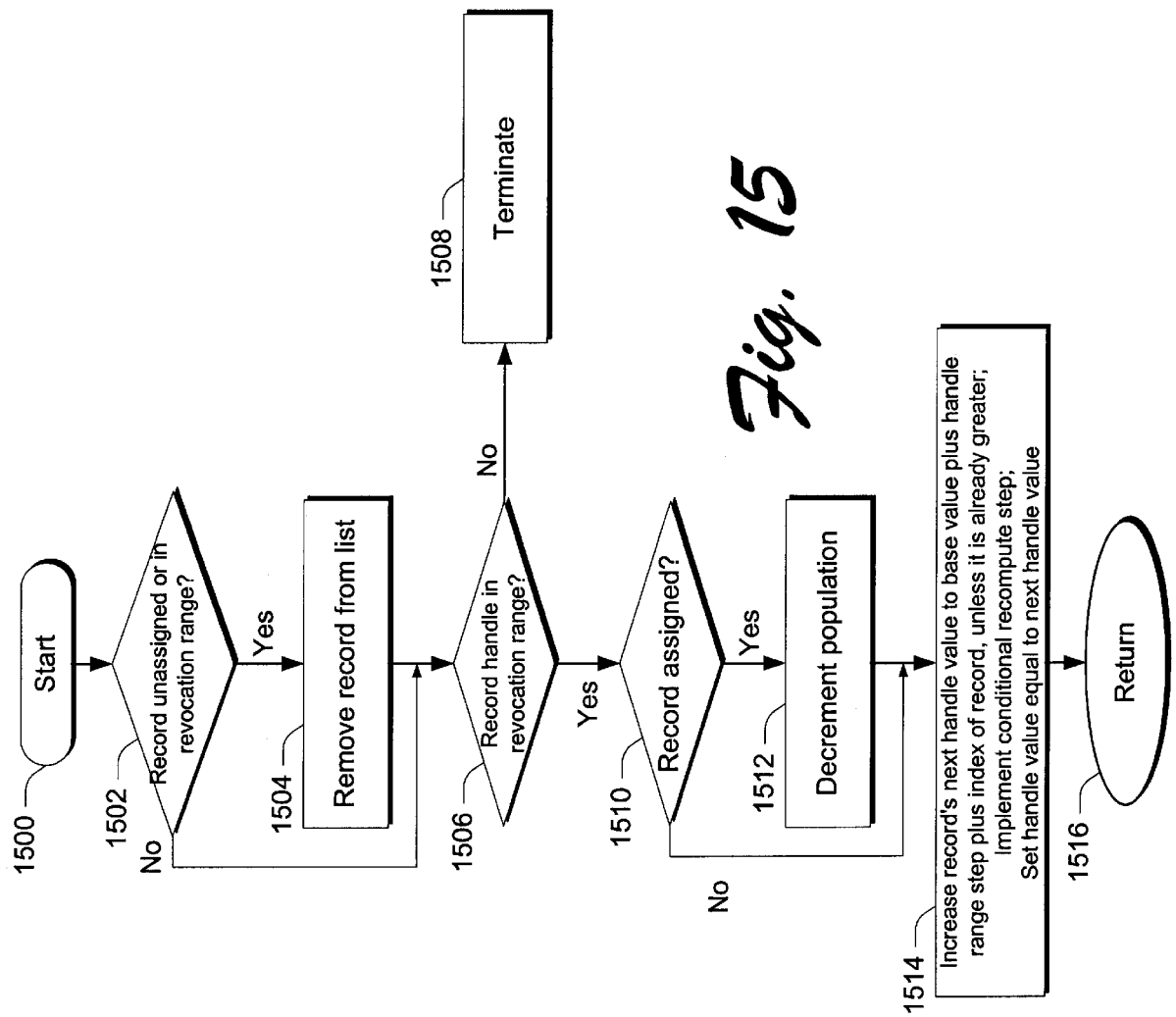

GENERATION, VALIDATION AND RESERVATION OF REFERENCE HANDLES

RELATED APPLICATION

This application is a continuation-in-part of U.S. patent application Ser. No. 09/103,334, now U.S. Pat. No. 6,105,039 entitled "Generation and Validation of Reference Handles", filed on Jun. 23, 1998, the disclosure of which is incorporated by reference herein.

TECHNICAL FIELD

The present invention is related to computer systems for generating, managing and validating reference handles of consumers requiring access to resources.

BACKGROUND

It is not uncommon for software modules operating on computer systems to require access to shared resources. For example, a given computer program may require access to files maintained by a file system, or it may require access to network connections maintained by a network driver. Network drivers may require access to information structures maintained by a network packet classifier. This is a complex arrangement that includes numerous software modules, such as software drivers requiring access to many shared resources and an access supervisor that either maintains the resources or at least intercedes in access by the software modules to the resource.

Such intercession exists for several reasons, one especially important reason being when a software module deletes a resource. If a first software module were to delete a first resource, while other software modules maintain direct pointers to the first resource, the pointers of the other software modules would be unaware of the deletion of the resource and would no longer point to a valid resource. Attempts have been made to solve this problem by notifying software modules when a resource deletion occurs. However, this requires detailed accounting and tracking of software modules and their respective pointers to the resources. As a result, this process is extremely expensive and very complex.

Another attempt to solve this problem involves having an access supervisor intercede when a software module requires access to a particular resource. Interceding ensures that the particular resource still exists before the software module is granted access to the particular resource. Typically, this is accomplished by having the access supervisor issue to each software module a handle to a particular resource, rather than allowing each software module a direct pointer to that particular resource. The software module does not use the handle to access the resource directly. Instead, the software module presents the handle to the access supervisor, which can dereference the handle to obtain a pointer to the resource for that software module. Although this approach allows the access supervisor to have control over the management of the shared resources, prior methods that follow this approach provide only rudimentary control, and thus have several limitations.

First, prior methods are inefficient, expensive and limited in their use because they lack constant-time operations, which is a problem when the number of simultaneously active handles is large. Also, the handle databases of prior methods have limited flexibility because they are not capable of growing and shrinking arbitrarily in an efficient manner. In addition, prior methods lack fast and efficient dereferencing and are ineffective in a multi-threaded environment. Further, prior methods lack efficient processes for recycling handles to increase handle space and to optimize the handle database. Therefore, what is needed is a computer-implemented system for generating and validating reference handles effectively and efficiently that overcomes these limitations.

Another problem associated with prior methods is the inability to efficiently reserve a handle value to indicate lack of a valid handle. Specifically, if one agent or consumer requests a resource handle from another agent or resource consumer, and if the second agent does not have a handle to the requested resource, it would desirable for the handle administration system to provide an efficient mechanism by which the first contacted agent could articulate that it does not have a valid handle to the second agent. One solution might be to, immediately after instantiating a handle database, call the assign routine to assign a handle value to a null reference. However, this approach wastes a location in the handle database, and more importantly, the initially assigned handle will eventually be revoked by the handle recycling routine, thus preventing its use as a guaranteed reserved value.

Whatever the merits of the prior systems and methods, they do not achieve the benefits of the described embodiments.

SUMMARY

To overcome the limitations in the prior art described above, and to overcome other limitations that will become apparent upon reading and understanding the present specification, the described embodiments are embodied in a system and method for generating and validating reference handles for consumers requiring access to resources in a computer system. The generation and validation of reference handles of the described embodiments provide efficient management and administration of consumers' access to resources in numerous computer environments, such as networked computers and non-networked personal computers.

The described embodiments include a resource manager having a handle administrator, a plurality of consumers, and a plurality of resources. In the description that follows, the term "consumer" refers to a software module that, among other things, requires access to a resource (e.g., a printer driver requiring access to a dynamic link library file). The term "resource manager" refers to a software module that either maintains the resources or at least intercedes in access by the consumers to the resource. The resource manager manages handles that it issues to consumers.

The handle administrator includes an assignment routine, a release routine, and a dereference routine. The assignment routine issues new handles, the release routine releases handles that are no longer required (thus rendering the handle invalid), and the dereference routine dereferences handles into a pointer to a resource which entails verifying that the handle is valid. In addition, the described embodiments include an auxiliary sub-routine for managing used and unused records, an expansion sub-routine for efficiently expanding the handle database, a handle recycling sub-routine for recycling handles, a contraction sub-routine for efficiently contracting the handle database, a hysteresis sub-routine for probabilistically contracting the handle database, and a memory allocation failure sub-routine.

A feature of the described embodiments is that handle assignment and release are constant-time operations, which is especially important if the number of simultaneously active handles is large. Another feature is that the handle administrator of the described embodiments has efficient assignment, release, and dereferencing routines that effectively work in a multi-threaded environment. Another feature of the described embodiments is that the size of the database is capable of growing arbitrarily, which is important if the number of handles is unknown ahead of time; and the size of the database is capable of shrinking when possible, which is especially important if the number of handles varies dramatically. Yet another feature of the described embodiments is that if the number of handles issued over a lifetime exceeds the size of the handle space, then handles can be recycled.

Therefore, the handle administrator of the described embodiments is designed to work efficiently and effectively when the number of simultaneously active handles is large, when the number of simultaneously active handles is unknown ahead of time, when the number of simultaneously active handles varies dramatically over time, when handle dereferencing needs to be very fast, when operating in multi-threaded environments, and when the number of handles issued over a lifetime is large relative to the handle space.

In addition, one feature of the described embodiments is the ability to reserve a reference handle value that can be used for an indication of a lack of a valid handle. When the handle database is initially instantiated, at least one handle value is reserved. The reserved handle value is never available for a consumer to use to obtain a pointer to a resource. Whenever a new handle value is computed, the new handle value is tested to ascertain whether it is equal to the reserved handle value. If it is, the new handle value is recomputed to equal the next valid handle for the given location in the handle database.

The foregoing and still further features and advantages of the described embodiments as well as a more complete understanding thereof will be made apparent from a study of the following detailed description of the described embodiments in connection with the accompanying drawings and appended claims.

BRIEF DESCRIPTION OF THE DRAWINGS

Referring now to the drawings in which like reference numbers represent corresponding parts throughout:

FIGS. 5–7 are diagrams visually illustrating the handle recycling sub-routine of the present described embodiments;

FIG. 10 is a flow diagram illustrating the dereference routine of the present described embodiments;

FIG. 15 is a flow diagram illustrating the record processing sub-routine of the revoke ancient handles sub-routine of the present described embodiments.

DETAILED DESCRIPTION

In the following description, reference is made to the accompanying drawings which form a part hereof, and in which is shown by way of illustration a specific example in which the described embodiments may be practiced. It is to be understood that other embodiments may be utilized and structural changes may be made without departing from the scope of the claimed subject matter.

OVERVIEW

Exemplary Operating Environment

Figure 1:
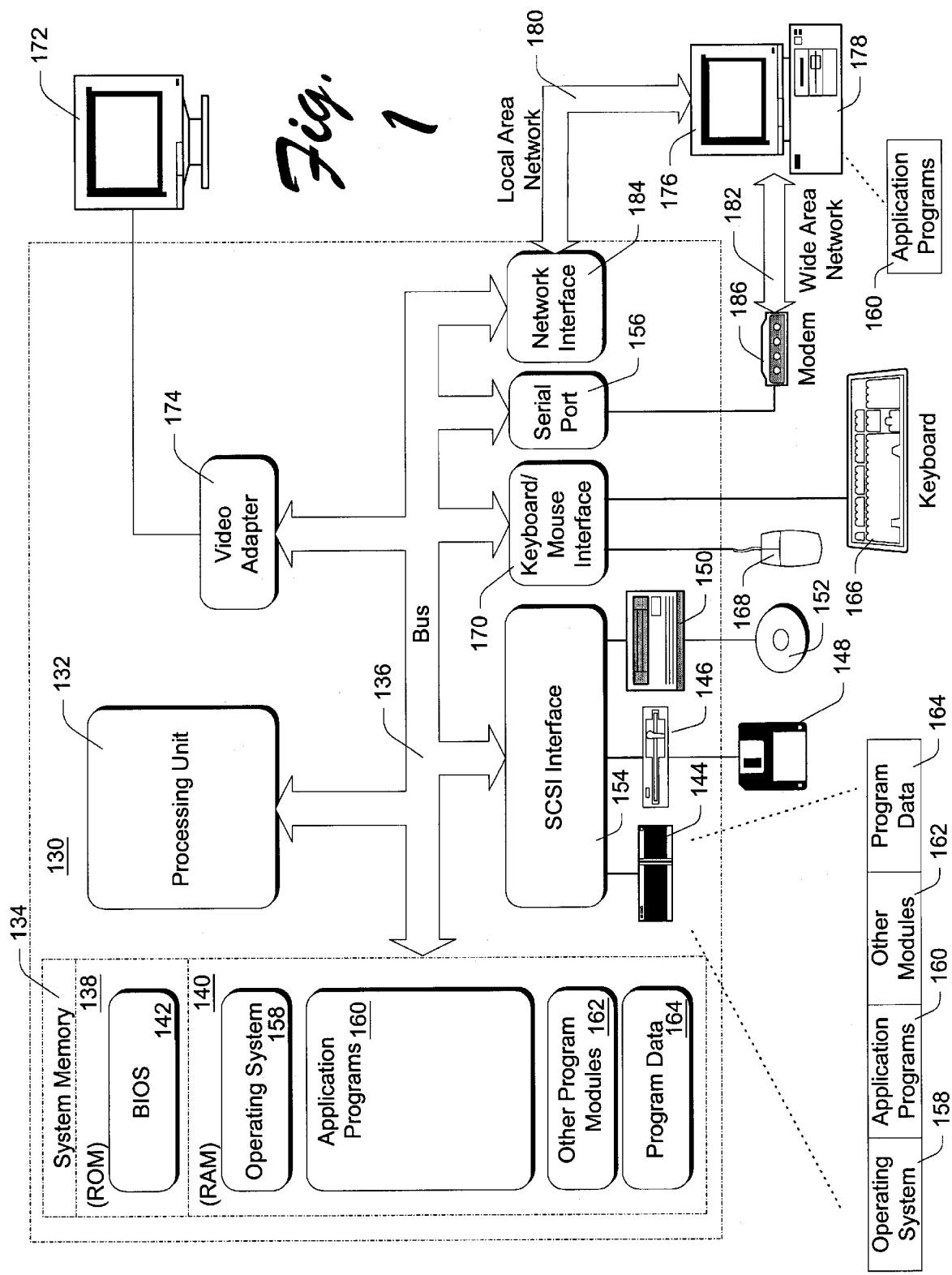
FIG. 1 is a block diagram illustrating an apparatus for carrying out the described embodiments.

FIG. 1 and the following discussion are intended to provide a brief, general description of a suitable computing environment in which the described embodiments may be implemented. Although not required, the described embodiments will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the described embodiments may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

FIG. 1 shows a general example of a computer 130 that can be used to implement the various described embodiments. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Basic System

Figure 2:
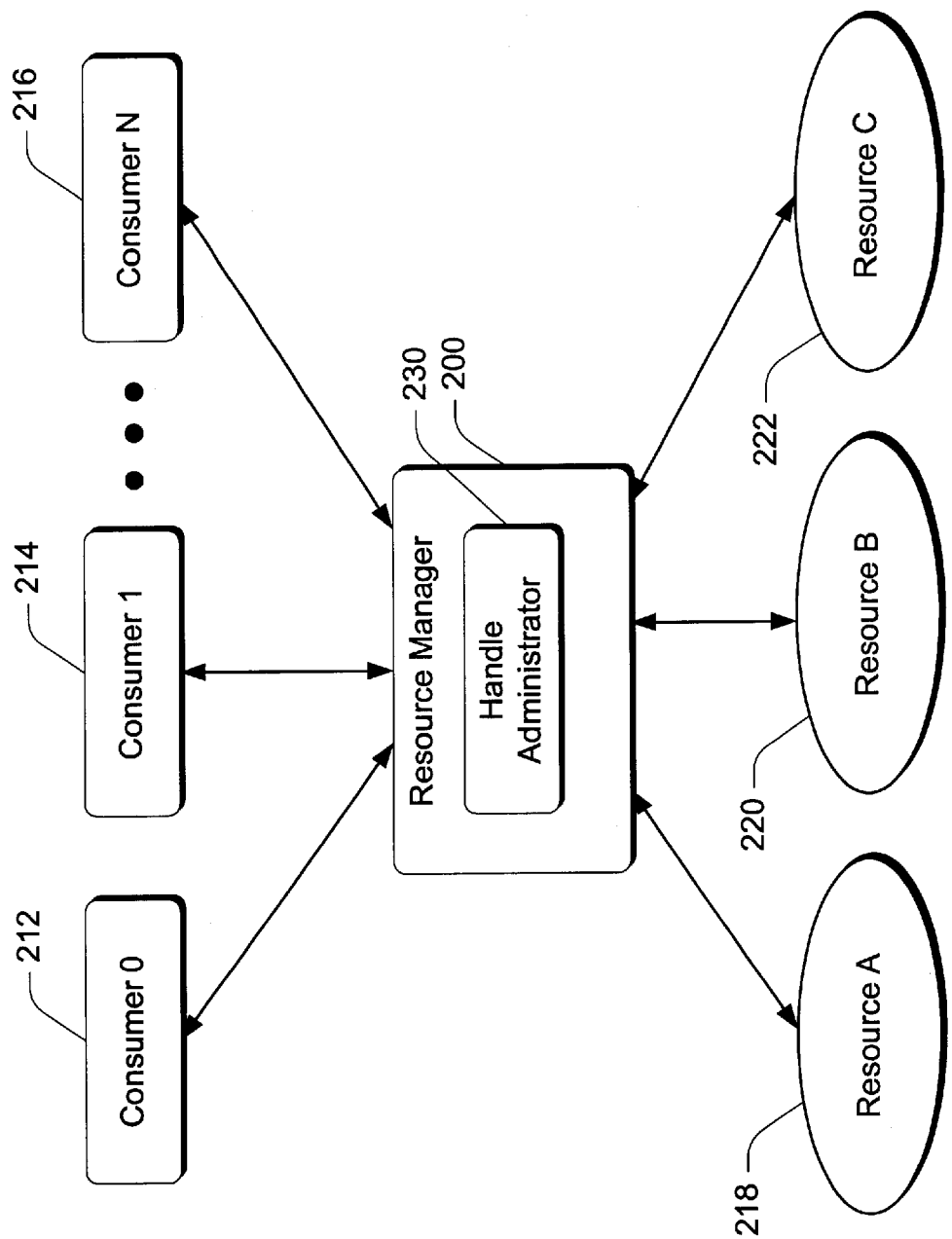
FIG. 2 is a general block diagram illustrating the interaction between the main components of the present described embodiments.

FIG. 2 is a general block diagram illustrating the interaction between the main components of the present described embodiments. The present described embodiments include a resource manager 200, a plurality of consumers 212, 214, 216, and a plurality of resources 218, 220, 222. The resource manager 200 also has a 200 a handle administrator 230. The consumers 212, 214, 216 are software modules. The resources 218, 220, 222 are computer software resources, such as dynamic link library files. The software modules 212, 214, 216 may at some time require access (either sole or shared) to one or all of the resources 218, 220, 222. For instance, a printer driver software module usually requires access to a dynamic link library file resource.

The handle administrator 230 generates and validates reference markers or handles to provide consumer and resource administration facilities to the resource manager 200. The handle administrator 230 efficiently manages access to the resources 218, 220, 222 with the use reference handles. The handle administrator 230 intercedes with reference handles when a consumer requires access to a particular resource. Interceding involves issuing, to the consumer, a handle to a particular resource, rather than allowing the consumer a direct pointer to that particular resource. The consumer cannot use the handle to access the resource directly. Instead, the consumer presents the handle to the handle administrator 230, which first verifies that the handle is valid, then dereferences the handle to obtain a pointer to the resource for that consumer. Thus, interceding ensures that the particular resource still exists before the consumer is granted access to the particular resource.

In general, the handle administrator assigns, releases, and dereferences handles to the consumers 212, 214, 216 that point to the resources 218, 220, 222. The resource manager 200 is a software module that either maintains the resources 218, 220, 222 or at least intercedes in access by the consumers 212, 214, 216 to the resources 218, 220, 222. The resource manager 200 manages the handles that it issues to consumers 212, 214, 216.

Figure 3:
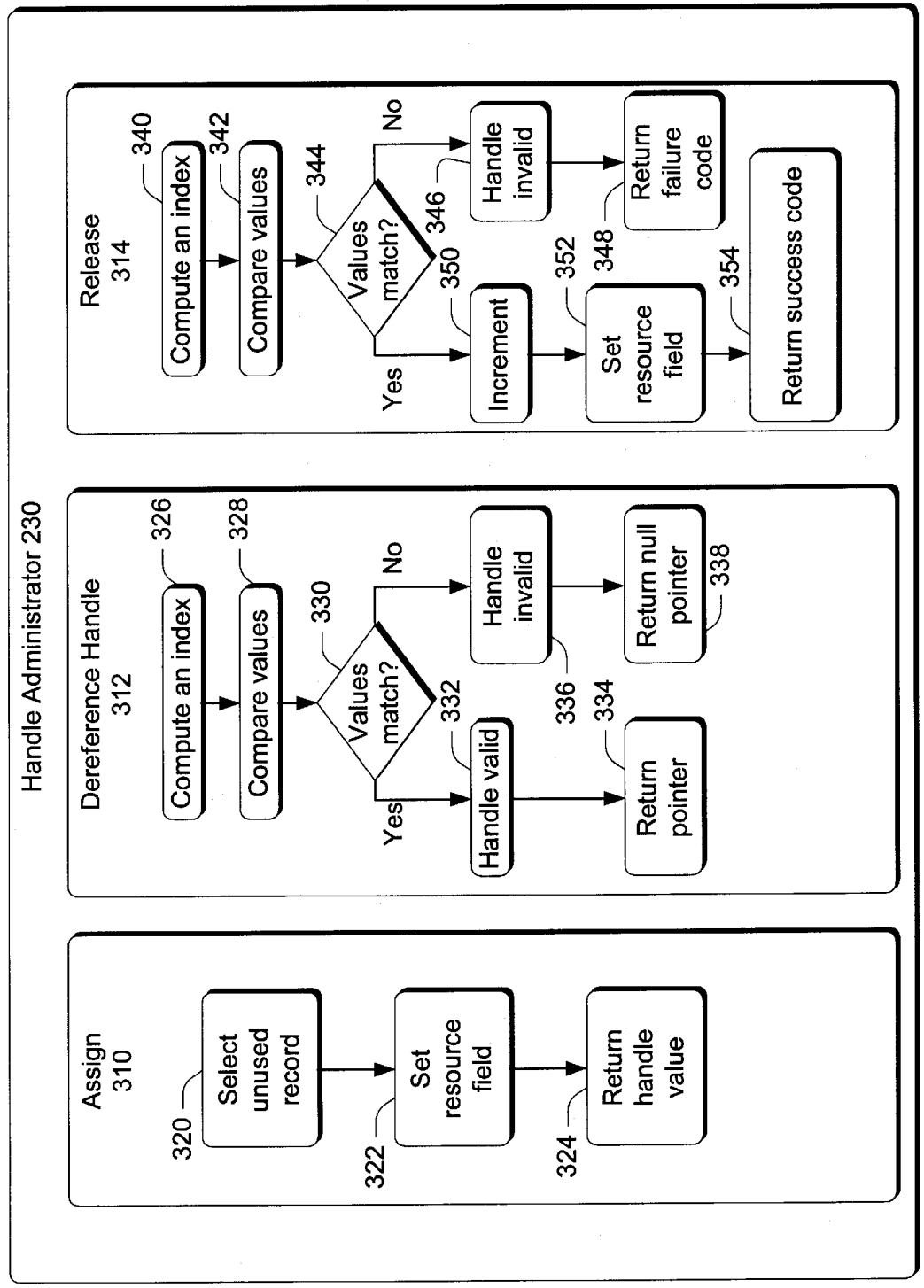
FIG. 3 is a flow diagram illustrating the basic operation of the handle administrator of the present described embodiments.

FIG. 3 is a flow diagram illustrating the general operation of the handle administrator of the present described embodiments. Referring to FIG. 2 along with FIG. 3, the handle administrator 230 implements the above described operations with an assignment routine 310 for issuing new handles, a release routine 314 for releasing handles that are no longer needed, and a dereference routine 312 for converting a handle into a pointer to a resource, including verifying that the handle is valid. The present described embodiments provide each of these operations in the form of a function that can be invoked by code in the resource manager 200. Namely, these functions can be defined as an assign_handle( ) function, a release_handle( ) function, and a dereference_handle( ) function, respectively.

The assign_handle( ) function accepts a pointer to a resource and returns a handle that will henceforth refer to the pointer. The release_handle( ) function accepts a handle and marks it as invalid, such that it should no longer refer to a resource pointer, and returns a status code indicating whether the handle it was passed is a valid handle. The dereference_handle( ) function accepts a handle, checks its validity, and if the handle is valid, returns a pointer to the appropriate resource, but if the handle is invalid, returns a null pointer. The implementation of these functions is fairly complex, so the following section presents an incremental description of the handle administrator, beginning with the most basic system and progressively adding valuable features until the final system is reached.

A handle could in theory be any type of value, since it is opaque to the resource manager 200 and to the consumers 212, 214, 216. In the present described embodiments, a handle is an unsigned integer. At its most basic, the data structure of the present described embodiments comprises an array of records, each of which contains the fields described in Table 1.

TABLE 1

Fields in each record of basic system

| Type | Field | Description |
|---|---|---|
| Handle | handle | handle value |
| Resource * | resource | pointer to resource |

The nomenclature "Resource *" in Table 1 is defined as a "pointer to Resource." This nomenclature is standard in the C programming language and will be used throughout.

Initially, the handle value for each record is set equal to the index of that record, as indicated in the example of Table 2. Each currently valid handle corresponds to a record in the array.

TABLE 2

Initial state of basic system of size 4

| Index | Handle | Resource |
|---|---|---|
| 0 | 0 | Null |
| 1 | 1 | Null |
| 2 | 2 | Null |
| 3 | 3 | Null |

When the handle administrator 230 is asked to issue a new handle, via a call to assign_handle( ), it selects an unused record (box 320), sets the resource field of the record to the resource pointer that is passed as an argument (box 322), and returns the handle value in the handle field of the record (box 324).

For example, if the resource manager 200 calls assign_handle( ) with a pointer to resource A, the handle administrator may select the record at index 0, in which case it will set the resource field to point to resource A and return a handle value of 0 to the resource manager. The array of records will thus be modified as indicated in Table 3.

TABLE 3

State of example basic system after one assignment

| Index | handle | Resource |
|---|---|---|
| 0 | 0 | A |
| 1 | 1 | Null |
| 2 | 2 | Null |
| 3 | 3 | Null |

When the handle administrator 230 is asked for the pointer that corresponds to a given handle, via a call to dereference_handle( ), it computes an index by taking the value of the handle modulo the size of the array (box 326), it compares the value in the handle field of the indexed record to the handle value that is passed as an argument (box 328), and it determines if the values match (box 330). If the two values match, the passed handle is judged to be valid (box 332), and the pointer in the resource field of the indexed record is returned (box 334). If the two values do not match, the passed handle is judged to be invalid (box 336), and a null pointer is returned (box 338).

For example, if the resource manager 200 calls dereference_handle( ) with a handle of value 0, the handle administrator 230 computes an index by taking this value modulo 4, yielding an index of 0. It then compares the handle to the value in the handle field of record 0. Since the two values match, the pointer to resource A is returned.

When the handle administrator 230 is asked to release a handle, via a call to release_handle( ), it computes an index by taking the value of the handle modulo the size of the array (box 340), it compares the value in the handle field of the indexed record to the handle value that is passed as an argument (box 342), and it determines if the values match (box 344). This comparison is not strictly necessary, but it is a simple check for an erroneous argument. If the two values do not match, the passed handle is judged to be invalid (box 346), and a failure status code is returned (box 348). Otherwise, it increments the value in the handle field by the size of the array (box 350), sets the resource field to a null pointer value (box 352), and returns a success status code (box 354). The reason for incrementing the handle value by the size of the array is so that the new value of the handle field will yield the same index when taken modulo the array size. The reason for setting the resource field value to null is so that the handle administrator can determine that the record is unused and that it therefore may be reassigned.

For example, if the resource manager calls release_handle( ) with a handle of value 0, the handle administrator computes an index by taking this value modulo 4, yielding an index of 0. It then compares the handle to the value in the handle field of record 0. Since the two values match, the value in the handle field is set to 4 and the value in the resource field is set to null. The array of records will thus be modified as indicated in Table 4.

TABLE 4

State of example basic system after one release

| Index | handle | resource |
|---|---|---|
| 0 | 4 | null |
| 1 | 1 | null |
| 2 | 2 | null |
| 3 | 3 | null |

Now, if the resource manager calls dereference_handle( ) with a handle of value 0, the handle administrator computes an index by taking this value modulo 4, yielding an index of 0. It then compares the handle to the value in the handle field of record 0. Since the two values do not match, a null pointer is returned.

Next, suppose that the resource manager calls assign_handle( ) again, this time with a pointer to resource B. Furthermore, suppose that the handle administrator selects record 0, sets the resource field to point to resource B, and returns a handle value of 4 to the resource manager. The array of records will thus be modified as indicated in Table 5.

TABLE 5

State of example basic system after another assignment

| Index | handle | resource |
|---|---|---|
| 0 | 4 | B |
| 1 | 1 | null |
| 2 | 2 | null |
| 3 | 3 | null |

If the resource manager calls dereference_handle( ) with a handle of value 4, the handle administrator computes an index by taking this value modulo 4, yielding an index of 0. It then compares the handle to the value in the handle field of record 0. Since the two values match, the pointer to resource B is returned. By contrast, if the resource manager calls dereference_handle( ) with a handle of value 0, the handle administrator computes an index by taking this value modulo 4, yielding an index of 0, which is the same index that it computed for a handle value of 4. However, when it compares this handle to the value in the handle field of record 0, the two values do not match, so a null pointer is returned.

RESERVING A HANDLE VALUE

It is desirable for consumers to be able to communicate with one another that they lack a valid resource handle. In one embodiment, the concept of a reserved handle value is introduced. The reserved handle value is a value that is reserved by the resource administration system and is never issued to a consumer for use in accessing a resource. Rather, its use is limited to indicating lack of a valid resource handle. For example, if a consumer requests a resource handle from a second consumer, and the second consumer does not have the requested resource handle, the second consumer can pass the reserved handle value to the first consumer and thereby indicate that it does not have a handle to the resource.

Figure 3A:
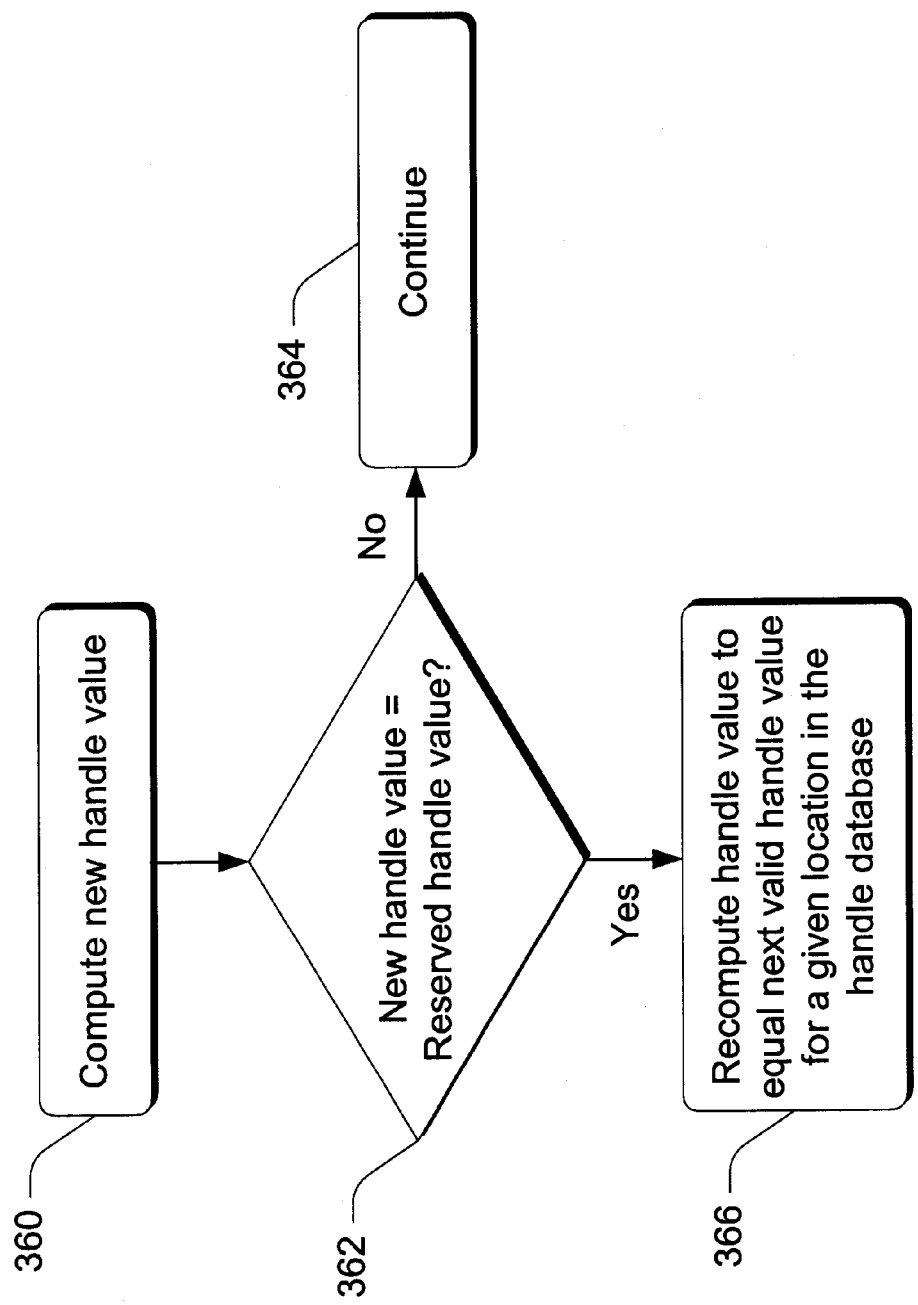
FIG. 3A is a flow diagram that describes a conditional recompute step in accordance with the described embodiment.

FIG. 3A illustrates a handle value reservation method in accordance with the described embodiment. A handle value is reserved for an indication of a lack of a valid handle. In the example given above, the reserved handle value is equal to zero. This requires a slight modification when the handle database is instantiated. None of the handle values in the handle database are equal to the reserved handle value. In the above example, when the handle database is initially instantiated with two handle values, the values 1 and 2 are used, rather than 0 and 1. This ensures that the reserved handle value of 0 is never placed in the handle database when it is instantiated. One embodiment includes a procedure that is referred to in the discussion that follows as "conditional recomputation" or a "conditional recompute" step. As illustrated in FIG. 3A, step 360 of the conditional recomputation procedure computes at least one new handle value (e.g. to provide to a consumer to access a particular resource). Responsive to computing the new handle value, the step 362 tests the new handle value to ascertain whether it is equal to the reserved handle value. If the new handle value is not equal to the reserved handle value, then whatever process that is taking place continues (step 364). If, on the other hand, the new handle value is equal to the reserved handle value, step 366 recomputes the new handle value to equal the next valid handle value for the given location in the handle database. The conditional recompute step occurs in the discussion below in the following specific places: box 818 (FIG. 8), box 1110 (FIG. 11A), box 1210 (FIG. 12A), and box 1514 (FIG. 15).

WORKING EXAMPLE

Figure 4:
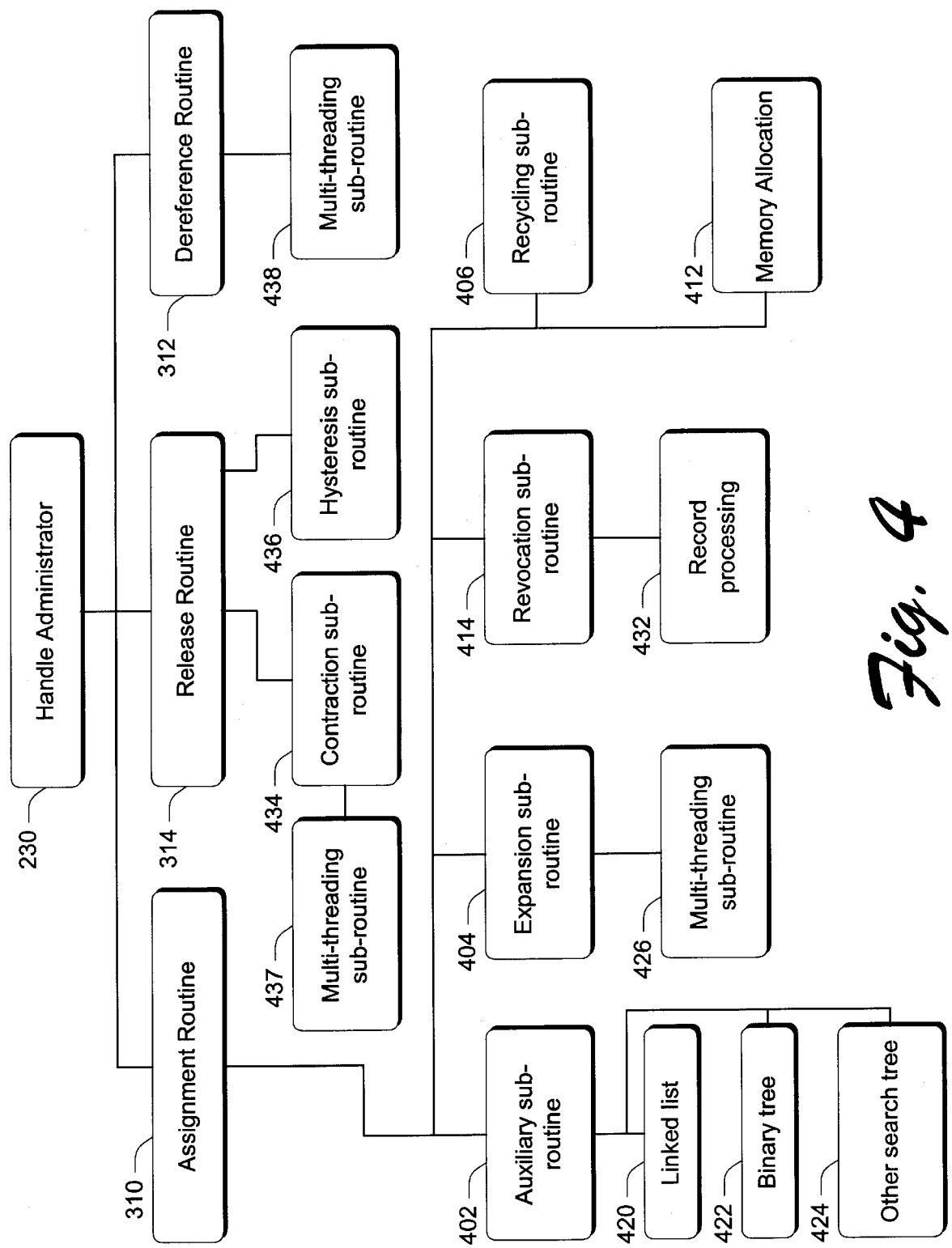
FIG. 4 is an architectural block diagram illustrating the main components and the sub-components of a working example of the present described embodiments.

FIG. 4 is an architectural block diagram illustrating the main components and the sub-components of a working example of the present described embodiments. Now that the basic system has been described above, the following sections below describe an incremental description of a working example of the handle administrator of the present described embodiments, beginning with the auxiliary structure and progressively adding valuable features until the final working example is described.

Referring to FIG. 4, the assignment routine 310 of the handle administrator 230 includes an auxiliary sub-routine 402 for managing used and unused records, an expansion sub-routine 404 for efficiently expanding the handle database, a handle recycling sub-routine 406 for recycling handles, a memory allocation failure sub-routine 412, and a revocation sub-routine 414 for automatically revoking ancient handles. A conditional re-computation routine can be included in the assignment routine, expansion sub-routine, and revocation sub-routine as will become apparent below. A specific example of this is given later in the text in the section entitled "Integrated Components". For the discussion that follows immediately below, a conditional re-computation routine is not assumed.

The auxiliary sub-routine 402 can have a linked list 420, binary tree 422, or any other 424 search tree sub-routine suitable for carrying out the described embodiments. The expansion sub-routine 404 has a multi-threading sub-routine 426. The revoke sub-routine has a record processing 432 sub-routine for processing high and low records.

The release routine 314 has a contraction sub-routine 434 and a hysteresis sub-routine 436. The contraction sub-routine 434 has a multi-threading sub-routine 437. The dereference routine 312 has a multi-threading sub-routine 438. A conditional re-computation routine can be included in the contraction sub-routine, as will become apparent below. A specific example of this is given later in the text in the section entitled "Integrated Components". For the discussion that follows immediately below, a conditional re-computation routine is not assumed.

Auxiliary Structure

The following section describes the auxiliary sub-routine 402 of the present described embodiments. As described above, the handle administrator 230, in response to each call to assign_handle( ), searches through the array to find an unused record. If the array size is very small, as it is in the above example, this is not a very expensive operation. However, the cost varies linearly with the array size, so it can be quite expensive if the array size is large. A simple optimization, such as maintaining a linked list of unused records can reduce this cost to a constant. When a new handle is to be issued, a record from this list is selected; and when a handle is released, the associated record is added to the list. This requires adding a new field to each record, as indicated in Table 6.

TABLE 6

Fields in each record of basic system with list

| Type | Field | Description |
| --- | --- | --- |
| Handle | handle | handle value |
| Resource * | resource | pointer to resource |
| Record * | next_record | pointer to next record in list |

The new field, next_record, is a pointer to a record. A pointer to the head of the list is maintained, and each unused record contains a pointer to another record on the list, except the last, which contains a null pointer. (Note that array indices could have been used instead of pointers to link the records of the list.)

Further optimizations with linked lists 420 and search trees 422, 424 can be made depending on the desired efficiency of the system. For instance, when a new handle is to be issued, an optimization method can be implemented so that the proper record is selected from the unused records in the array with efficiency considerations. For example, if the record with the lowest index were selected, then the handle value in the lower records would tend to increase (as handles are assigned and released) faster than those in the upper records. Since the handle space is limited by the number of bits in the handle, eventually the lower records might exhaust all of their possible handle values well before the upper records consume a significant portion of their possible values, thus inefficiently utilizing the handle space. This problem can be eliminated by issuing handles from all records with relatively even frequency, which can be accomplished by issuing the lowest handle value among all unused records. To facilitate this procedure, the unused records should be stored in a structure that lends itself to rapid selection of the record with the lowest handle value, such as a search tree 422. However, searching for the lowest value in a set (or equivalently, inserting a new value in sorted position into a set) is an inherently logarithmic-time operation, rather than a constant time operation. It is rather desirable for the assign_handle( ) and release_handle( ) functions to be constant time, irrespective of the number of active handles.

The preferred approach preserves the constant-time operation of the assign and release functions (and does not interfere with the enhancements described in subsequent sections), and issues handles from the records with approximately even frequency. The approach is to use a linked list 420 as described above, wherein records are removed for assignment from the head of the list and are placed upon release at the tail of the list. This requires maintaining a pointer to the tail of the list in addition to the pointer to the head. Given a relatively random release pattern, this approach will tend to distribute the assignment of handles relatively evenly among the records. It should be noted that, given any auxiliary structure, it is no longer necessary for the handle administrator 230 to set the resource field value to null when a handle is released, since the record's presence in the structure indicates that it is unused.

Database Expansion

The following section describes the expansion sub-routine 404 which is utilized when the assign_handle( ) function is called but all records are in use. Without a mechanism to increase the size of the handle database, there is no desirable way to respond to a request for a handle assignment when the database is full: Either the request is rejected, or a handle entry is taken from those already in use. Broadly, the expansion sub-routine 404 is performed to increase the size of the array so that more records are available for assignment. However, it is not generally possible to allocate additional memory immediately following a given area of used memory, since that following memory area may be in use for storing other data. Therefore, increasing the size of the array requires allocating a separate, larger area of memory, copying the information from the smaller array into the larger array, and deallocating the memory for the smaller array. The new increased size is selected in a manner that preserves mapping of distinct handles to distinct entries.

For example, consider a fill array of size 4 as illustrated in Table 7.

TABLE 7

State of example basic system prior to expansion

| Index | handle | resource |
| --- | --- | --- |
| 0 | 4 | B |
| 1 | 1 | A |
| 2 | 10 | D |
| 3 | 7 | C |

If the array size were increased to 6, then an attempt to dereference handle 7 would yield an index of 1 (=7 mod 6). However, an attempt to dereference handle 1 would also yield an index of 1, resulting in a conflict. In general, the expansion should be such that if two handles yield the same index in the larger array, then they should also have yielded the same index in the smaller array (although the converse is nether required nor desired). This can be accomplished by increasing the array size by an integral multiplicative constant. Choosing the constant and the initial array size to be powers of 2 simplifies the effort somewhat, since it allows simple bit manipulation operations to be employed in the place of more involved mathematical operations. For the remainder of the description, it is assumed that the multiplicative constant is 2, such that the size of the array is doubled with each expansion. Thus, the array size is increased to 8, as illustrated in Table 8.

TABLE 8

State of example basic system after expansion

| Index | handle | resource | next_record |
| --- | --- | --- | --- |
| 0 | 8 | null | 3 |
| 1 | 1 | A | Null |
| 2 | 10 | D | Null |
| 3 | 11 | null | 6 |
| 4 | 4 | B | Null |
| 5 | 5 | null | 0 |
| 6 | 14 | null | Null |
| 7 | 7 | C | Null |

Note that there are no conflicts among the assigned handles. Handles 1 and 10, which had previously yielded respective indices of 1 and 2 (1 mod 4=1; 10 mod 4 =2), still do (1 mod 8=1; 10 mod 8=2); however, handles 4 and 7, which had previously yielded respective indices of 0 and 3 (4 mod 4=0; 7 mod 4=3), now yield respective indices of 4 and 7 (4 mod 8=4; 7 mod 8=7). After memory for the larger array is allocated, the records are copied from the smaller array to the larger array, in accordance with the indices computed with respect to the larger array. The resource pointers of all other records in the larger array are set to null values (although, as mentioned above, this is not strictly necessary if there is an auxiliary structure that keeps track of which records are unused). Values for the handle fields of these other records are computed as described below.

To begin with, it should be noted that there are two indices in the larger array that correspond to each index in the smaller array. For example, indices 0 and 4 in the larger example array above correspond to index 0 in the smaller example array, meaning that any handle value which yields an index of 0 or 4 in the larger array will yield an index of 0 in the smaller array. Thus, when the smaller array is expanded into the larger array, the record at index 0 in the smaller array belongs at either index 0 or index 4 in the larger array. These two indices are known as "duals" of each other. When copying a record from the smaller array into the larger array, the handle value modulo the new array size yields the index of one of the duals, into which is copied the record. The value for the handle field in the other dual is set equal to the copied record's handle value plus the size of the smaller array.

For instance, the record in index 0 of the small array illustrated in Table 7 has a handle value of 4. Taking this value modulo the larger array size (8) yields 4, so this record is copied into the record with index 4 in the larger array, as illustrated in Table 8. The dual of this record is record 0, so its resource pointer is set to null, and its handle value is set to 8 (4+4).

For a second example, the record in index 1 of the small array illustrated in Table 7 has a handle value of 1. Taking this value modulo the larger array size (8) yields 1, so this record is copied into the record with index 1 in the larger array, as illustrated in Table 8. The dual of this record is record 5, so its resource pointer is set to null, and its handle value is set to 5 (1+4).

If the unused records are kept in an auxiliary structure as described in the previous section, the new unused records are inserted into that structure.

If, as described above, the size of the array is increased by a multiplicative constant, then the array will grow geometrically, which has the very desirable property that the mean time to issue a handle is asymptotically bounded by a constant. Specifically, consider that in the above example the array size grew from 4 to 8 in response to a single request to issue a handle. This required 4 records to be copied and 4 new records to be initialized. The next 3 handle assignments will not require expanding the array, so the average cost of issuing each of these 4 handles is one copy and one initialization. Similarly, if no handles are released, then the next assignment will grow the array size from 8 to 16, requiring 8 copies and 8 initializations. The next 7 handle assignments will not require expanding the array, so the average cost of issuing each of these 8 handles is one copy and one initialization. If any handles are released during such a sequence of operations, then the average cost per assignment will be lower. Thus, the array grows geometrically, and thus, the mean time to issue a handle is asymptotically bounded by a constant.

Table 8 also illustrates the next_record field of auxiliary sub-routine 402 described above. Although the next_record field is defined in Table 6 as a pointer to a record, in Table 8 it is shown as the index of a record for clarity. The goal of auxiliary sub-routine 402 is to maintain the unused records in a list that is approximately sorted by handle value. In Table 8, the list of unused records is shown as fully sorted, which is ideal but not guaranteed behavior. The head of the list is the record with index 5, which information is stored by sub-routine 402 in a location that is separate from the table itself. As seen in Table 8, the record with index 5 has a handle value of 5, which is the smallest unused handle value in the database. This record has a next_record value of 0, indicating that the next record in the list of unused records is the record with index 0, which has a handle value of 8. This record has a next_record value of 3, indicating that the next record in the list of unused records is the record with index 3, which has a handle value of 11. This record has a next_record value of 6, indicating that the next record in the list of unused records is the record with index 6, which has a handle value of 14. This record has a next_record value of null, indicating that it is the last unused record in the list. Thus, the list of unassigned handle values is seen to be in the order {5, 8, 11, 14}, which is correctly sorted. All records with assigned handles have next_record values of null.

Database Contraction

The following section describes the contraction sub-routine 434. Although contraction of the handle database is not necessary, it may be desirable, especially if the memory footprint of the handle administrator is critical. The contraction sub-routine 434 frees system memory. If more handles are required than there are records available in which to store them, then the database should be expanded with the expansion sub-routine 404. However, as handles are released, a situation could arise wherein far fewer handles are required than there are records. Although this does not cause direct functional problems, it can cause indirect problems, namely the consumption of more system resources (in particular, memory) than necessary.

As an example, consider a scenario in which, ordinarily, there are approximately 10 active handles at any given time, leading to an array size of 16, given the binary expansion described above. If, over a short period of time, the number of active handles increases to 1000, then the array size will increase to 1024. Once this brief burst is over, the number of active handles reduces to 10; however, if the array size remains at 1024, then 99% of the memory consumed by the handle administrator is being wasted.

The present described embodiments thus include a contraction sub-routine 434 for contracting the handle database. Although similar to the reverse of the expansion sub-routine, there are complex additions to the contraction sub-routine. First, whereas it is normally possible to expand the database (assuming more memory can be allocated), in some situations it is not possible to contract the database, even if the number of active handles is not greater than half of the array size. Consider the array of handle records illustrated in Table 9.

TABLE 9

Example basic system in non-contractible state

| Index | handle | resource |
|-------|--------|----------|
| 0 | 16 | null |
| 1 | 1 | A |
| 2 | 10 | D |
| 3 | 11 | null |
| 4 | 12 | null |
| 5 | 5 | E |

TABLE 9-continued

Example basic system in non-contractible state

| Index | handle | resource |
|---|---|---|
| 6 | 22 | null |
| 7 | 7 | C |

Although this array of size 8 contains only 4 active handles, contraction of the array to a size 4 would cause a conflict. Specifically, handle 1 and handle 5 would both yield the same array index for their records (1 mod 4=5 mod 4=1). In other words, they are duals of each other, and since they are both assigned, they would conflict if the array size were reduced to 4. Two records that are duals of each other and are both assigned will be referred to hereinafter as an "assigned pair." In general, a handle array can be contracted only if it contains no assigned pairs, such as the array illustrated in Table 8.

The count of assigned pairs in the database can be tracked with the following process. When the database is initialized, or when it is expanded, the count of assigned pairs is set to zero. Whenever a handle is issued from a record whose dual already holds an assigned handle, then the assigned pair count is incremented by one. Whenever a handle is released from a record whose dual holds an assigned handle, then the assigned pair count is decremented by one. Recalculation of the assigned pair count after a contraction will be described in detail below.

In addition, there is a minimum array size restriction for the contraction sub-routine. Clearly, the array cannot be contracted if its size is one, but it is desirable to set a larger value for the minimum array size. Namely, the preferred method of the present described embodiments requires a minimum array size of two, and therefore the array should be at least of size four before the contraction sub-routine is utilized. Other restrictions of the contraction sub-routine are desirable as well, and will be described in detail in a subsequent section.

It should be noted that the contraction sub-routine requires adding a new field to each record, as illustrated in Table 10.

TABLE 10

Fields in each record of contractible system

| Type | Field | Description |
|---|---|---|
| Handle | handle | handle value |
| Handle | next_handle | next handle value |
| Resource * | resource | pointer to resource |

The new field, next_handle, holds the next handle value that will be issued from the record. If the record is unused, then this value is equal to the handle value. If the record is in use, then this value is greater than the handle value by some multiple of the array size. An array of records containing the next_handle field is illustrated in Table 11. This example array will be used for the discussion of contraction.

TABLE 11

State of example basic system prior to contraction

| Index | handle | next handle | resource |
|---|---|---|---|
| 0 | 8 | 8 | null |
| 1 | 17 | 17 | null |
| 2 | 10 | 18 | D |
| 3 | 11 | 11 | null |
| 4 | 4 | 4 | null |
| 5 | 5 | 13 | E |
| 6 | 30 | 30 | null |
| 7 | 7 | 15 | C |

Note that the five records not containing assigned handles have handle and next_handle fields that are equal, whereas the three records containing assigned handles have handle and next_handle values that differ. By default, the difference between a record's handle value and its next_handle value is equal to the current array size.

Handle assignment and release involving this new field will now be discussed. If, for example, record 0 is selected to issue a handle, then the handle issued would have the value 8, and the next_handle field would be incremented by the array size, resulting in a value of 16. Further, when handle value 8 is released, then the handle field of record 0 is updated with the next_handle field of record 0, yielding the value of 16. Thus, use of the next_handle field serves to split into two steps the incrementing of a handle value by the array size that was described in a previous section.

The need for the next_handle field and its use in contraction will be described below. But first, Table 12 is shown to illustrate the state of the array after the contraction is complete.

TABLE 12

State of example basic system after contraction

| Index | handle | next handle | resource |
|---|---|---|---|
| 0 | 4 | 4 | null |
| 1 | 5 | 13 | E |
| 2 | 10 | 26 | D |
| 3 | 7 | 11 | C |

The contraction sub-routine sets all three fields of each record. Specifically, for the resource field, if neither of the corresponding duals is in use, then the resource pointer is set to null. Otherwise, the resource pointer is set to the resource pointer of the record that is in use. For example, to set the resource pointer of record 0 in the smaller array the two corresponding dual records in the larger array (0 and 4) are examined. Since neither is in use, the appropriate value is a null pointer. For another example, to set the resource pointer of record 1 in the smaller array, the two corresponding dual records in the larger array (1 and 5) are examined. Since record 5 is in use, the appropriate value is copied from record 5 in the larger array, namely a pointer to resource E.

For the next_handle field, the larger of the next_handle fields is selected from each corresponding dual, and the size of the smaller array is subtracted from this value. For example, to set the next_handle field of record 0 in the smaller array, the two corresponding dual records in the larger array (0 and 4) are examined. Since the next_handle fields are respectively 8 and 4, and the larger of these is 8, the value of 8 is selected and then the size of the smaller array (4) is subtracted from 8 to get a value of 4.

This procedure guarantees that the next handle value issued from the new record will not be identical to a handle value that was already issued and released. For example, the record at index 1 of the larger array has a handle value of 17, implying that this record had previously issued a handle value of 9 (=17−8). Thus, when the array is contracted and the new record's next_handle field is set to 13, handle value 9 will not be re-issued. By contrast, if the next_handle field was not added to the records, then after handle 5 had been released, the next handle value issued from this record would have been computed as 9 (=5+4).

It should be noted that handle values that have never been issued may be eliminated. For example, the record at index 6 of the larger array has a handle value of 30, implying that this record had previously issued a handle value of 22 (=30−8). So, when the array is collapsed, the next_handle field of record 2 of the smaller array is set to 26, preventing handle value 22 from being re-issued. However, this next_handle value also prevents handle value 18 from being issued, even though it had not been issued before. But contracting the array is performed in order to reduce the space requirement of the database, so the space available to store such information is also reduced. Experiments have shown that even with highly fluctuating array sizes, if the handles are released randomly, then handle values are consumed only about 12% to 16% more rapidly than they would have been without contraction.

The handle field of each record is set with the following procedure. If neither of the corresponding duals is in use, then the handle value is set equal to the record's next_handle field. Otherwise, the handle value is set to the handle field of the record that is in use. For example, to set the handle value of record 0 in the smaller array, the two corresponding dual records in the larger array (0 and 4) are examined. Since neither is in use, the handle value is set to the next_handle value, which is 4. As another example, to set the handle value of record 1 in the smaller array, the two corresponding dual records in the larger array (1 and 5) are examined. Since record 5 is in use, the handle value is copied from record 5 in the larger array, specifically a value of 5.

Completing the contraction process requires an additional step, namely the recalculation of the assigned pair count. The process is straightforward and is as follows. The subroutine iterates through half of the array, and at each step, if the record and its dual are both assigned, then the subroutine increments the assigned pair count. Note that it is not necessary to zero the assigned pair count prior to this procedure. This is because it is already required to be zero for a contraction to occur. It is slightly easier to implement this procedure if the array is never smaller than two records, so that each record in the array has a dual.

Note that the procedures described in this section require determining whether an arbitrary record is assigned. If the only indication of a record's assignment status is the list on which the record is held, this status can be relatively expensive to determine. This is because it can require searching through the entire list. However, as indicated in previous sections, a record can be deemed unassigned by setting its resource pointer to null, which will allow a fast, constant-time determination of the record's assignment status. One potential problem with this technique is that a consumer could conceivably desire to assign a handle to a null pointer, and doing so would cause the handle administrator to incorrectly determine whether a record is assigned. As mentioned above, if a record is unassigned, then its next_handle value is equal to its handle value. In contrast, if a record is assigned, then its next_handle value is not equal to its handle value. This condition is checked by the present described embodiments to determine whether a record is assigned.

Improving Contraction Opportunities

As mentioned in the previous section, contracting a handle array requires not merely that there be no more active handles than will fit in the contracted array but furthermore that the array contain no assigned pairs. As the array size grows, this becomes progressively less likely. The probability that a random configuration of n handles will yield no assigned pairs in an array of size m is given by the following formula:

$P(m, n) = 1 - U(m, n)/C(m, n)$

C is the binomial coefficient of m and n, and U is given by the following recurrence:

$U(m, n) = C(m-2, n-2) + 2\ U(m-2, n-1) + U(m-2, n)$ $U(2, 0) = 0;\ U(2, 1) = 0;\ U(2, 2) = 1$

This expression becomes computationally expensive to evaluate as the values of m and n increase. However, for some fairly small values, Table 13 shows the probability that no assigned pairs exist given various array sizes and various numbers of assigned handles.

TABLE 13

Probability of contractibility for m records and n assigned handles

| | n = 2 | n = 4 | n = 8 | n = 16 |
|---|---|---|---|---|
| m = 2 | 0 | — | — | — |
| m = 4 | 0.67 | 0 | — | — |
| m = 8 | 0.86 | 0.23 | 0 | — |
| m = 16 | 0.93 | 0.62 | 0.02 | 0 |
| m = 32 | 0.97 | 0.81 | 0.31 | 1.1e-4 |

As can be seen in Table 13, with an array size of 32, there is only a one-in-a-thousand chance that a random set of 16 assigned handles will happen to have no assigned pairs. Thus, although it might be desirable to contract such an array from 32 records to 16 records, it is not likely that this can be accomplished. Once the number of assigned handles drops to 8, then the probability rises to 31% that the array can be contracted to a size of 16, but then there is only a 2% probability that it can be contracted further to a size of 8.

Because the condition that enables contraction is relatively unlikely to arise on its own, it is desirable to actively pursue this condition. The handle administrator has no control over which handles are released, but it can control from which records handles are assigned, and this does present an avenue by which the expected number of assigned pairs can be reduced.

For instance, consider the handle array illustrated in Table 9. There is only one assigned pair of records, namely those with indices 1 and 5. Suppose that, prior to the release of either of these handles, the resource manager requests the issue of a new handle. In accordance with the auxiliary sub-routine, as described above, the selected record should be the one with the lowest handle value, which is record 3. However, if record 3 is selected, and then handle 1 is released, the array cannot be contracted. This is because there is still an assigned pair of records, namely those with indices 3 and 7. As such, the production of the assigned pair hindered the ability to contract the database. Alternately, if the handle was issued from either the record with index 0 or the record with index 4, then an assigned pair would not have been produced, and thus when handle 1 was released, the array could be contracted. Index 4 should be chosen over index 0, since it has a lower handle value.

As a result, a handle should be issued from a record that will not produce an assigned pair, if possible. One way to implement this requirement is to maintain two lists of unused records, one of which contains those records from which handles can be issued without producing an assigned pair, and one of which contains those records from which the issue of handles will produce an assigned pair. Then, only a handle is issued from the second list if the first list is empty.

As an example, for the handle array illustrated in Table 9, the primary list contains only record 4, whereas the secondary list contains records 0, 3, and 6. The reason that record 0 is on the secondary list, rather than on the primary list, is that once a handle is issued from record 4, issuing a handle from record 0 will produce an assigned pair. Record 4, rather than record 0, is on the first list because it has a lower handle value.

If handle 1 is released, then record 1 is placed onto the secondary list, since record 1's dual (record 5) has a handle that is assigned. If handle 10 is released, the handle value of record 2 is incremented by the array size to become 18, which is smaller than the handle value (22) of its dual (record 6), so record 2 is placed onto the primary list. If handle 7 is released, the handle value of record 7 is incremented by the array size to become 15, which is larger than the handle value (11) of its dual (record 3), so record 7 should be placed onto the secondary list, and record 3 should be relocated from the secondary list to the primary list. Since record 3 could be at any arbitrary location in the secondary list, it can be efficiently removed only if the list is doubly linked. Thus, a new field is added to each record, as illustrated in Table 14.

TABLE 14

Fields in each record of contractible system with doubly linked list

| Type | Field | Description |
| --- | --- | --- |
| Handle | handle | handle value |
| Handle | next_handle | next handle value |
| Resource * | resource | pointer to resource |
| Record * | next_record | pointer to next record in list |
| Record * | prev_record | pointer to previous record in list |

The new field, prev_record, is a pointer to a record, and each unused record uses this field to point to the previous record of whichever list it is on.

After the contraction has been performed, each record has a different dual than it did before. For example, in Table 12, the dual of record 0 is record 2, whereas prior to the contraction, its dual was record 4. Similarly, the dual of record 1 is record 3, whereas prior to the contraction, its dual was record 5. Thus, it is determined on which list each unused record belongs, according to the new pairing arrangement.

Referring back to the example in which the array illustrated in Table 11 is contracted to the array illustrated in Table 12, prior to the contraction, the primary list contains record 4. Also, the secondary list contains records 0, 1, and 6, in this order (assuming that they are sorted correctly, which is likely but not guaranteed). After the contraction, the only unused records are those that correspond to a record on the primary list before the contraction. In the example, pre-contraction record 4 is the only one on the primary list, and the corresponding post-contraction record is record 0, which, as can be seen in Table 12, is the only unused record after the contraction.

Since it is desirable to preserve the order of the lists, this sub-routine of the present described embodiments generates the new primary and secondary lists in two steps. First, in concert with calculating the new assigned pair count, each record and its dual are tagged with indications of the lists on which they belong. Second, the old primary list is iterated through and each record is placed onto the indicated list.

Contraction Hysteresis

In the previous section, a mechanism was presented to increase the likelihood that an array can be contracted. The following section describes a contraction hysteresis sub-routine 436 that delays contracting an array beyond the point at which it becomes possible to do so.

It was mentioned above that, if the array is expanded geometrically, then the mean time to issue a handle is asymptotically bounded by a constant. However, this is not guaranteed to be the case if the array is contracted as well as expanded. For instance, consider an example in which the number of active handles is 4 and in which the array size is also 4. When another handle is issued, the array is expanded to a size of 8, requiring 4 records to be copied and 4 records to be initialized. If this new handle is then released, the array can be contracted back to a size of 4, requiring the merging of 4 pairs of records. This sequence can be repeated indefinitely, such that each assignment will thus require 4 copies and 4 initializations, as the number of active handles oscillates between 4 and 5. Alternately, if the array size were to oscillate between 8 and 9, then each assignment would require 8 copies and 8 initializations. In general, if contractions are performed as soon as possible, the mean computational cost of an assignment becomes bounded by a linear function of the number of active handles, rather than by a constant.

The mean computational cost of assignments and releases can be returned to a constant value by adding appropriate hysteresis to the contraction operation. The method by which this hysteresis is achieved is as follows. A computational debt value is maintained. Initially, this value is set to zero, and each time an expansion operation is performed, the value is increased by the number of entry splitting operations, where a entry split comprises one entry copy and one entry initialization. Similarly, each time a contraction operation is performed, the value is increased by the number of record pairs merged. Each time an assignment or release operation is performed, the computational debt is decremented by one, with a lower limit of zero for the value of the debt. The array is only contracted if the computational debt is equal to zero.

Consider again the example above, in which the array size is increased from 4 to 8 when a fifth handle is assigned. Assuming that the computational debt was previously zero, this expansion causes the debt to be set to 4, and the accompanying assignment immediately decrements it to 3. If the handle is then released, this operation decrements the debt to 2, and since this is greater than zero, the array is not contracted. When the next handle is assigned, bringing the number of active handles back up to 5, the array need not be expanded, since it is already of size 8, and this assignment decrements the computational debt to 1. The next release decrements the computational debt to zero, so the array is then contracted if it can be; however, at this point, the cost of the previous expansion has been amortized over the previous two expansions and two contractions, so the mean cost per operation is a constant. Similarly, the present contraction will increase the computational debt to 4, so that the cost of the merges will be amortized over future assignment and release operations.

For large array sizes, tracking computational debt in the manner just described is very effective. However, for small array sizes, the cost of copying, initializing, and merging records is small relative to the cost of allocating and deallocating memory for expansions and contractions. Thus, even though the mean computational cost per operation is kept constant by this system, that constant value may be unacceptably high due to allocation/deallocation chatter. A simple solution to this problem is to add the cost of the allocation and deallocation operations into the computational debt incurred by expansion and contraction. The cost of memory allocation and deallocation was empirically determined for one specific implementation of the working example to be 12 times the cost of a single record-modifying operation. Thus, for this particular implementation, each time an expansion or contraction operation is performed, the computational debt is increased by a value of 12 plus the number of records that are modified.

Memory Allocation Failure

It is possible that an attempt to allocate memory will fail, and any system that allocates memory (such as the present described embodiments) should be prepared to deal with allocation failure. The described embodiments allocate memory on three occasions: at initialization, at each expansion, and at each contraction. If memory cannot be allocated at initialization, the creation of the handle administrator fails.

If memory cannot be allocated for an expansion, the obvious approach is to fail the attempt to assign a new handle for which there is no room in the array. However, there is an alternative approach, but it relies on modifying the semantics of the handle administrator. Up to this point, the system has functioned such that a handle is valid once it is assigned, and it remains valid until it is released. However, since a call to the dereference routine may return a null pointer, each consumer should be prepared for a handle to become invalid, if only because some other consumer may have released the handle. Thus, the new semantics empower the handle administrator to revoke handles, which will cause a handle to become invalid just as if it were released by an consumer.

Given this authority, the handle administrator can deal with a failed memory allocation by revoking one of the handles that are currently assigned and then assigning a new handle from this record. This approach may be desirable because the new handle is more likely to be used than a handle that was assigned a long time ago. This consideration suggests that the handle to revoke under these circumstances should be the oldest assigned handle, which requires keeping track of the order in which handles are assigned. Each record contains a pair of pointers to other records, and each unassigned record is on one of two lists. Up to this point, the assigned records have not been on any list, but it is trivial to place them on one such that they are in order of their assignment. Each time a record is assigned, it is placed at the tail of the list; when a record is released, it is removed from the list, and when a record is to be revoked due to memory allocation failure, it is taken from the head of the list. If memory cannot be allocated for a contraction, then the contraction is simply not performed. Since contracting the array is never necessary and can be delayed for other reasons as explained in the previous section, this response to allocation failure is acceptable.

Handle Recycling

As mentioned in the overview section, a handle is an unsigned integer. If the size of the integer is, for example, 32 bits, then there are only four billion or so unique handles that can be issued. In some scenarios, this may be sufficient. However, in others, it may not be. For instance, long-lived systems that assign and release handles very frequently may exhaust the handle space. One alternative to this problem is to make the handles bigger, but there may be cases for which this is either not practical or not sufficient. Another alternative is to utilize a recycle handle sub-routine 406 for recycling handles that have been invalid for a long time, under the theory that agents have had ample opportunity to notice that the handles have become invalid and are thus not going to attempt to dereference them again. It should be noted that the handle recycling sub-routine 406 is an optional function.

The handle recycling sub-routine 406 provides efficient handle recycling. If the handle value in a record is increased to a value beyond the representable range, then the value "wraps around" to a value which is equal to the larger value modulo the number of values in the representable range. For example, if the handle value (in hexadecimal) is FFFFFFFA, and this is increased by 8 (assuming that is the array size), then the result is 2, which is a handle value that was probably issued approximately four billion handle issuances earlier. There is, however, a danger that even though this handle value was issued a long time ago, it may have been released only recently. Thus, a consumer holding this handle may not yet have had the opportunity to notice that the handle has become invalid. A solution to this potential problem is to revoke any handles that become older than a set cutoff, so that consumers have sufficient opportunity to notice that the handles have become invalid.

Thus, the present described embodiments periodically revoke very old handles. The mechanism by which this is accomplished is as follows. First, two quantities are defined, the maximum handle range and the handle range step. For the following examples, it is assumed that the handles are 16-bit integers, that the maximum handle range is (hexadecimal) 9000, and that the handle range step is (hexadecimal) 2000. Initially a base value is set to 0, and a threshold value is set to the base value plus the maximum handle range, which in this case is 9000, as illustrated in FIG. 5. The shaded region in the figure illustrates the valid range of assigned handles, which is shown as 0 to about 2400, meaning that the largest handle value issued was about 2400.

As more handles are issued, the range of assigned handles grows. Once a handle value greater than the threshold value is issued, the system scans through all records in the array and revokes any handle within the range from the handle base (in this case 0) to the handle base plus the handle range step (in this case 2000). Then, the handle base and the threshold are increased by the handle range step, as shown in FIG. 6.

In all likelihood, there are very few (perhaps no) handles in this range, so the actual effect of this procedure is often unseen from outside the handle administrator. Once this procedure is completed, handles can continued to be issued until the next threshold value is reached, at which point another revocation pass is performed. Eventually, the threshold value will wrap around, as shown in FIG. 7.

Additionally, a comparison modification is utilized to enable the comparison of handle values to be performed correctly even after the values have wrapped around. In several places in the above-described methods, two handle values are compared to determine which one is larger. If handle values are allowed to wrap around, then this comparison is made relative to the handle base value, rather than as an absolute comparison. For example, consider the two handles E320 and 1162 in the scenario illustrated in FIG. 7. A standard comparison would conclude that E320 is the larger value. However, as can be seen in FIG. 7, this value is actually smaller than the other relative to the handle base value. In other words, if the range were to be shifted until the handle base were at zero, then this handle would be smaller.

This comparison can be performed correctly by first subtracting the handle base value from each handle value before comparing the result: E320–C000=2320 and 1162–C000=5162, and 2320 is less than 5162. Note that the subtractions implicitly wrap around for the same reason that addition implicitly wraps around. Namely, it is a by-product of integer math on a digital computer.

Multi-Threading

The handle administrator may be deployed in a multi-threaded environment with multi-threading sub-routines 426, 437, 438 for the assignment, release, and dereference routines 310, 314, 312, respectively. Due to the potential for conflicts in multi-threaded environments, it is common to employ locks to prevent different threads from interfering with each other in their use of a common data structure. There are two locking strategies that are common, single-access and single-writer/multi-reader. In single-access locking, only one thread may have access to the database at any given time, no matter what the thread is doing with the database. In single-writer/multi-reader, either one thread may access the database with read/write privileges, or any number of th reads may access the database with read-only privileges. The second type of locking is clearly less restrictive and therefore preferable, if it can be supported. The present described embodiments contain a mechanism that allows an even less restrictive form of locking. In this case, only one thread may access the database with read/write privileges, but any number of other threads may access the database with read privileges, even during the write access.

In particular, the system contains a lock. In order to invoke the assign_handle( ) routine, this lock is first taken. In order to invoke the release_handle( ) routine, this lock is first taken. However, a lock need not be taken in order to invoke dereference_handle( ). This is achieved with two different techniques, as described in this section.

To begin with, consider the situations in which multi-threading can cause problems. One situation occurs when the dereference_handle( ) routine attempts to validate a handle that is in the process of being invalidated by a call to release_handle( ) that is occurring in another thread. For correct behavior, the system behaves as though these two operations occur sequentially, even though they might in practice partially overlap. If the dereferencing occurs before the releasing, then a valid pointer will be returned; if the dereferencing occurs after the releasing, then a null pointer will be returned, indicating that the handle is not valid. The danger of multi-threading is that an invalid pointer will be returned. This can be avoided, without using locks, by careful ordering of read and write operations. The dereference_handle( ) routine performs steps in the following order:

Read value of pointer from record and store locally.

Read value of handle from record and validate against passed handle.

If handle is valid, return locally stored pointer; otherwise, return null pointer.

The alternate, and more natural, order is for the routine to first validate the handle and then read the pointer from the record. However, it is possible that, in between these two operations, the record will be invalidated and then reassigned to another pointer, and thus the wrong pointer will be returned by the dereference routine.

The above situation concerned the problem of safely invalidating handles. Another potential problem occurs with resizing the array. When the array is resized, a new array is allocated, and information from the old array is copied with modification into the new array. During this copying, the old array is unmodified, so handles can still be dereferenced by using the old array. Once the copying is complete, handles can be dereferenced by using either array, so at this point the system can safely switch the array pointer from the old array to the new array, after which it can safely deallocate the old array. It is important that the pointer to the array and the array size be switched simultaneously. If the dereference routine were to use an inconsistent set of these values when looking for a handle's record, it would compute the wrong array index from the handle value.

The system ensures that the two values are seen consistently by making use of two auxiliary variables called verifiers. Ordinarily, the two verifiers have the same value, but they are set to different values (by the expand and contract routines) when the array pointer and array size might be inconsistent. The verifiers are read and checked by the dereference routine to determine the consistency of the array pointer and array size variables. Between copying the records to the new array and deallocating the old array, the expand and contract procedures perform the following steps in order:

Increment verifier 0.

Update array pointer and array size.

Set verifier 1 equal to verifier 0.

The dereference routine performs the following steps in order:

Read value of verifier 1 and store locally.

Read array pointer and array size.

Compute record index.

Read values of pointer and handle from indexed record.

Read value of verifier 0 and compare to locally stored value of verifier 1.

If verifiers do not match, then repeat all above steps.

The repeat clause in the above procedure means that the dereference routine might spin for a while as it waits for the other thread to complete the array resizing. However, this is very unlikely, since the time during which the verifiers do not match is extremely short.

Integrated Components

The following section details an example of the present described embodiments with the above-described components in an integrated system. FIGS. 8–15 illustrate an integrated system including the assignment routine, the release routine, the dereference routine, the expansion sub-routine, the contraction sub-routine, the record updating sub-routine, the revoke sub-routine, and the record processing sub-routine as described in the above working example. It should be noted that all addition and subtraction operations are implicitly performed modulo the size of the handle space, and all comparison operations are performed relative to the handle base value, as described in the section above on handle recycling. In the examples that follow, a handle value of 0 is reserved by the system and is used for an indication of a lack of a valid handle.

Figure 8:
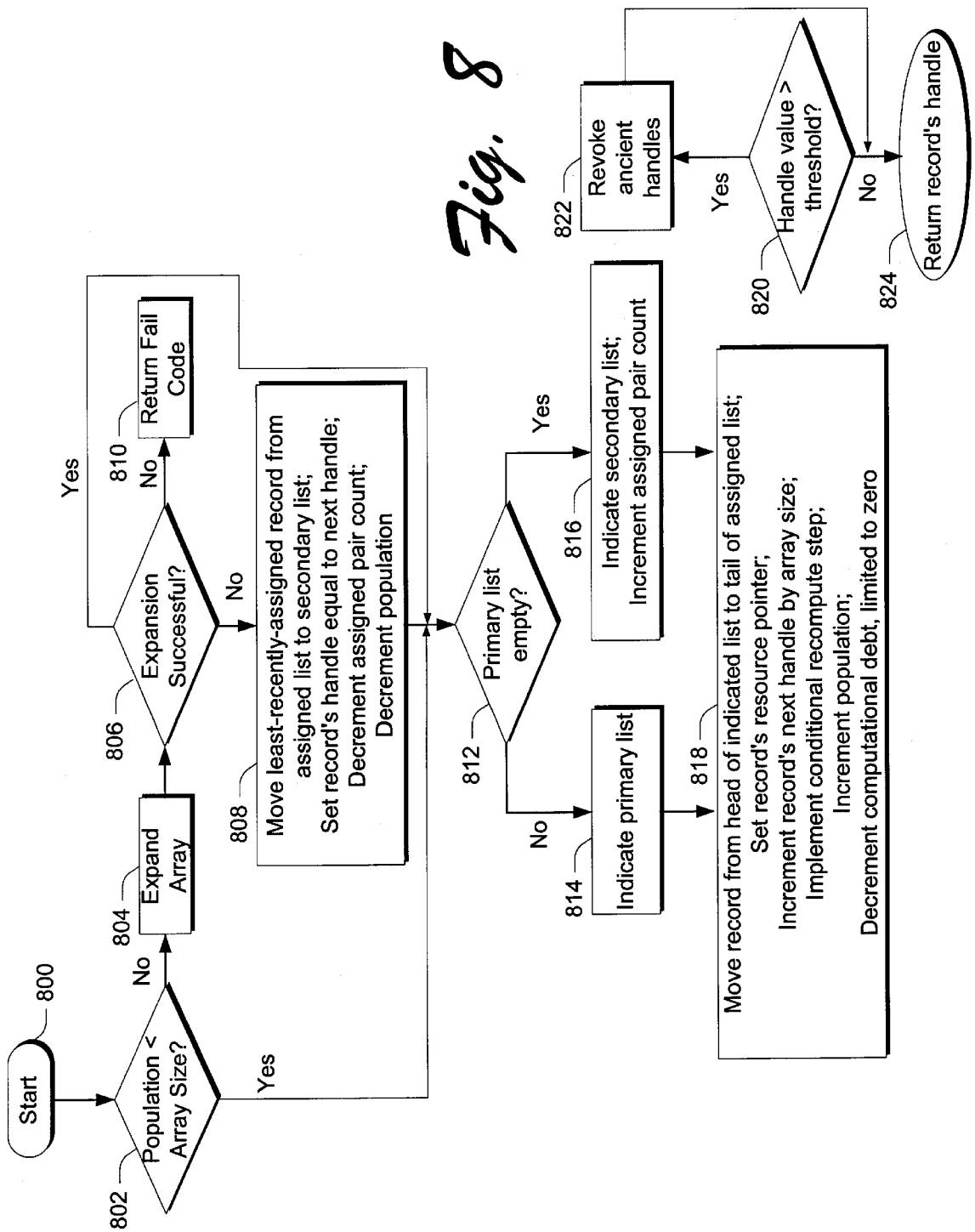
FIG. 8 is a flow diagram illustrating the assignment routine of the present described embodiments.

FIG. 8 is a flow diagram illustrating the assignment routine of the present described embodiments. The routine is started (box 800) and then it is determined whether the population is less than the array size (is any entry in the array currently unassigned?) (box 802). If the population is not less than the array size, then an s attempt to expand the array with the expansion sub-routine (see FIGS. 11A and 11B) is performed (box 804). It is then determined whether the expansion was successful (box 806). If the expansion was not successful, then the operation of the routine depends on how the system has been configured. Namely, if the system has been configured not to allow the handle administrator to revoke issued handles, then the routine returns with a failure code (dashed line to box 810). However, if the handle administrator has been configured with the authority to revoke issued handles, then it executes a memory allocation failure sub-routine (box 808). The memory allocation failure subroutine revokes the least-recently assigned handle in order to free an entry in the handle database for a new handle assignment. It performs this revocation by moving the least-recently assigned record from the assigned list to the secondary list, setting the record's handle equal to the next handle, decrementing the assigned pair count, and decrementing the population (box 808).

After either decrementing the population (box 808) or if the database expansion is successful (box 806) or if the population is less than the array size (box 802), steps are performed to improve contraction opportunities. This entails first determining whether the primary list is empty (box 812). If the primary list is not empty, then the primary list is indicated (box 814). If the primary list is empty, then the secondary list is indicated and the assigned pair count is incremented (box 816). In either case, next, the record is moved from the head of the indicated list to the tail of the assigned list, the record's resource pointer is set, the record's next handle is a incremented by the array size and a conditional recompute step is performed on the record's next handle. The population is then incremented, and the computational debt is decremented limited to zero for contraction hysteresis (box 818). It is then determined whether the handle value is greater than a threshold value (box 820). If the handle value is greater than the threshold value, then the revoke ancient handles sub-routine is performed (see FIG. 14) (box 822), and the record's handle is returned (box 824). If however the handle value is not greater than the threshold value, then the record's handle is returned (box 824) without first performing the revoke ancient handles sub-routine.

Figure 9:
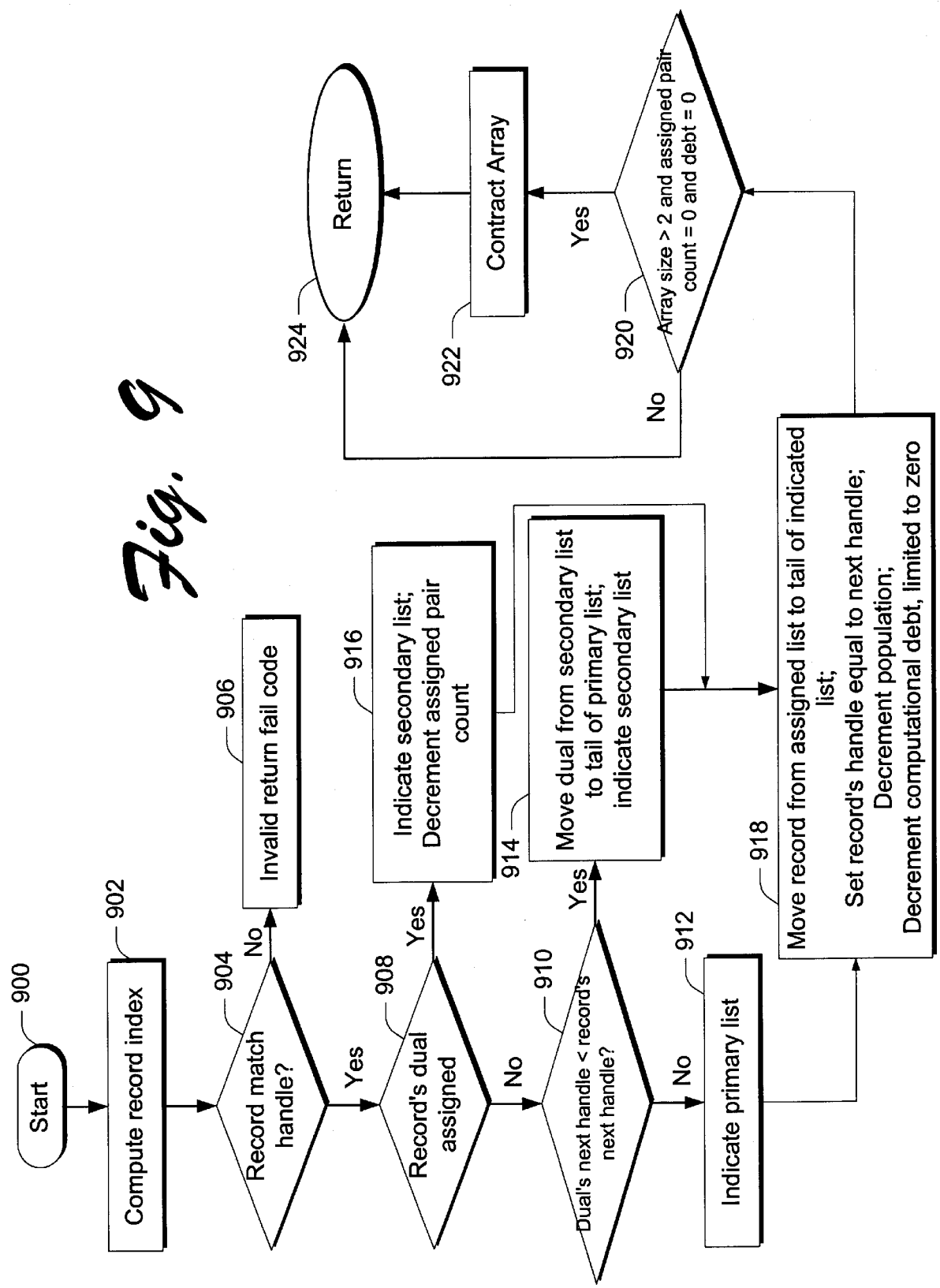
FIG. 9 is a flow diagram illustrating the release routine of the present described embodiments.

FIG. 9 is a flow diagram illustrating the release routine of the present described embodiments. The function starts (box 900) and then computes the record index (box 902). Next, it is determined whether the record matches the handle (box 904). If the record does not match the handle, then an fail code is returned (box 906), indicating that the handle is invalid. If the record does match the handle, it is determined whether the record's dual has been assigned (box 908).

If the record's dual has not been assigned, then it is determined whether the dual's next handle is less than the record's next handle (box 910). If the dual's next handle is not less than the record's next handle, then the primary list is indicated (box 912). If the dual's next handle is less than the record's next handle, then the dual is moved from the secondary list to the tail of the primary list, and the secondary list is indicated (box 914). If however, the record's dual has been assigned (as determined in box 908), the secondary list is indicated, and the assigned pair count is decremented (box 916).

After either the primary list is indicated (box 912), the secondary list is indicated (box 914), or the assigned pair count is decremented (box 916), the record from the assigned list is moved to the tail of the indicated list, the record's handle is set equal to the next handle, the population is decremented, and the computational debt is decremented, limited to zero (box 918). Next, it is determined whether the array size is greater than two, whether the assigned pair count is equal to zero, and whether the debt is equal to zero (box 920). If all of the aforementioned are true, then the contraction sub-routine is called (see FIGS. 12A and 12B) (box 922). If the contraction was successful a valid success code is returned (box 924). If the steps of box 918 are false, then the sub-routine returns (box 924) with a success code.

FIG. 10 is a flow diagram illustrating the dereference routine of the present described embodiments. The function can operate in a multi-threaded environment by starting (box 1000) and then making a local copy of verifier 1 (box 1002). Next, the record index is computed given an array size (box 1004). A local copy of the record's resource pointer is then made (box 1006). Next, a local copy of record's handle value is made (box 1008). It is then determined whether the local verifier matches verifier 0 (box 1010). If the local verifier does not match verifier 0, the above steps are repeated (boxes 1002–1008). If the local verifier does match verifier 0, then it is determined whether the local copy of the record's handle matches the handle (box 1012). If the local copy of the record's handle matches the handle, then the local copy of the record's pointer is returned (box 1014). If however, the local copy of the record's handle does not match the handle, then a null pointer is returned (box 1016).

Figure 11A:
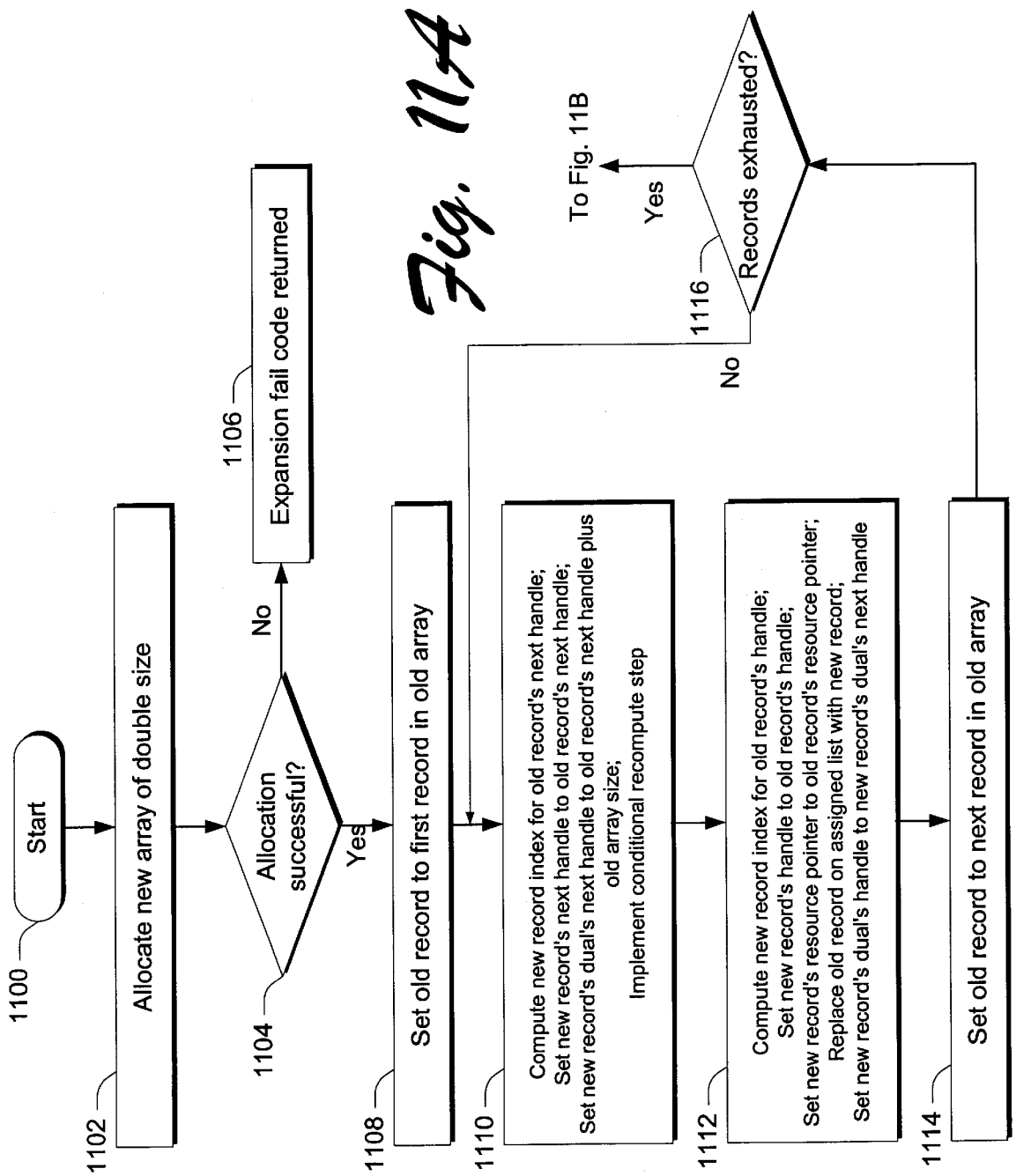
FIGS. 11A and 11B are flow diagrams illustrating the expansion sub-routine of the assignment routine of the present described embodiments.
Figure 11B:
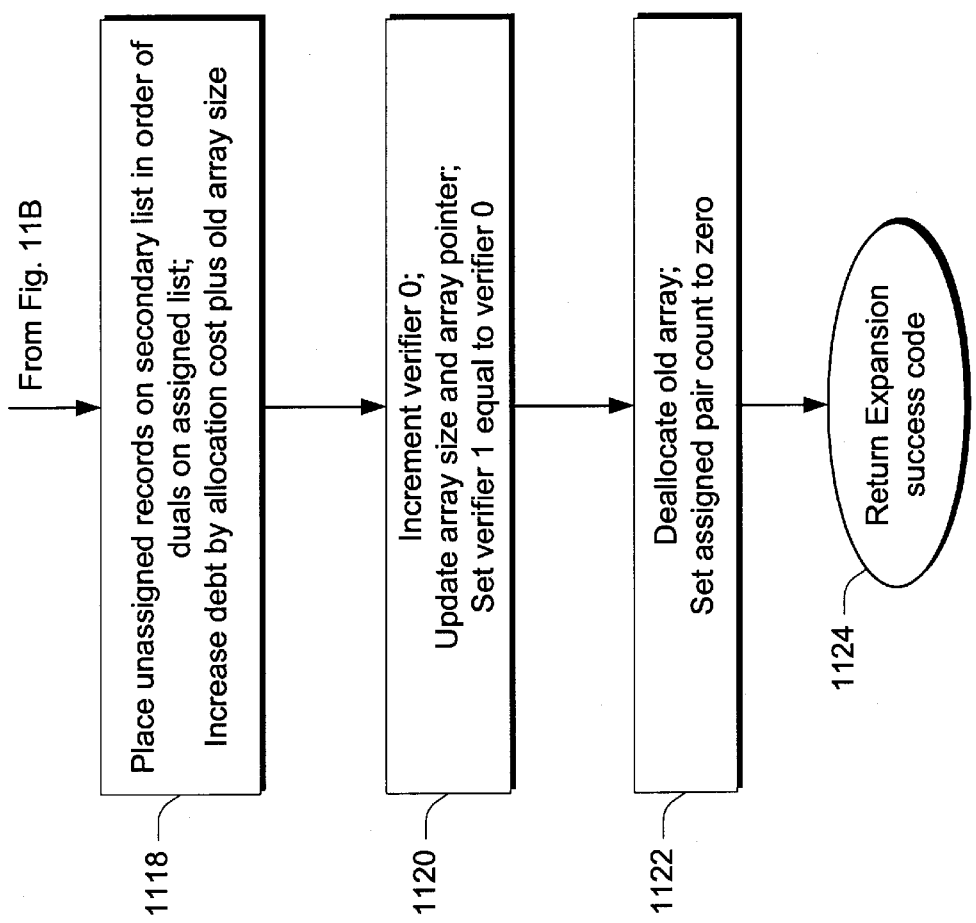

FIGS. 11A and 11B are flow diagrams illustrating the expansion sub-routine of the assignment routine of the present described embodiments. The function starts (box 1100) and then a new array of double size is allocated (box 1102). Next, it is determined whether the allocation was successful (box 1104). If the allocation was not successful, then an expansion fail code is returned (box 1106). If the allocation was successful, then an old record variable is set to the first record in the old array (box 1108). Next, the new record index for the old record's next handle is computed, the new record's next handle is set to the old record's next handle, and the new record's dual's next handle is set to the old record's next handle plus the old array size and a conditional recompute step is implemented on the new record's dual's next handle (box 1110). The new record's index for the old record's handle is computed, the new record's handle is set to the old record's handle, the new record's resource pointer is set to the old record's resource pointer, the old record on the assigned list is replaced with a new record, and the new record's dual handle is set to the new record's dual's next handle (box 1112). Next, the old record variable is set to the next record in the old array (box 1114). It is then determined whether the records are exhausted (box 1116). If the records are not exhausted, the steps in boxes 1110–1114 are repeated. These steps are cycled until all the records are exhausted (box 1116).

When the records are exhausted, the unassigned records are placed on the secondary list in the order of the duals on the assigned list, and the debt is increased by the memory allocation cost plus the old array size (box 1118). Verifier 0 is incremented, the array size and the array pointer are updated, and verifier 1 is set equal to verifier 0 (box 1120). The old array is deallocated, and the assigned pair count is set to zero (box 1122). Then, an expansion success code is returned (box 1124).

Figure 12A:
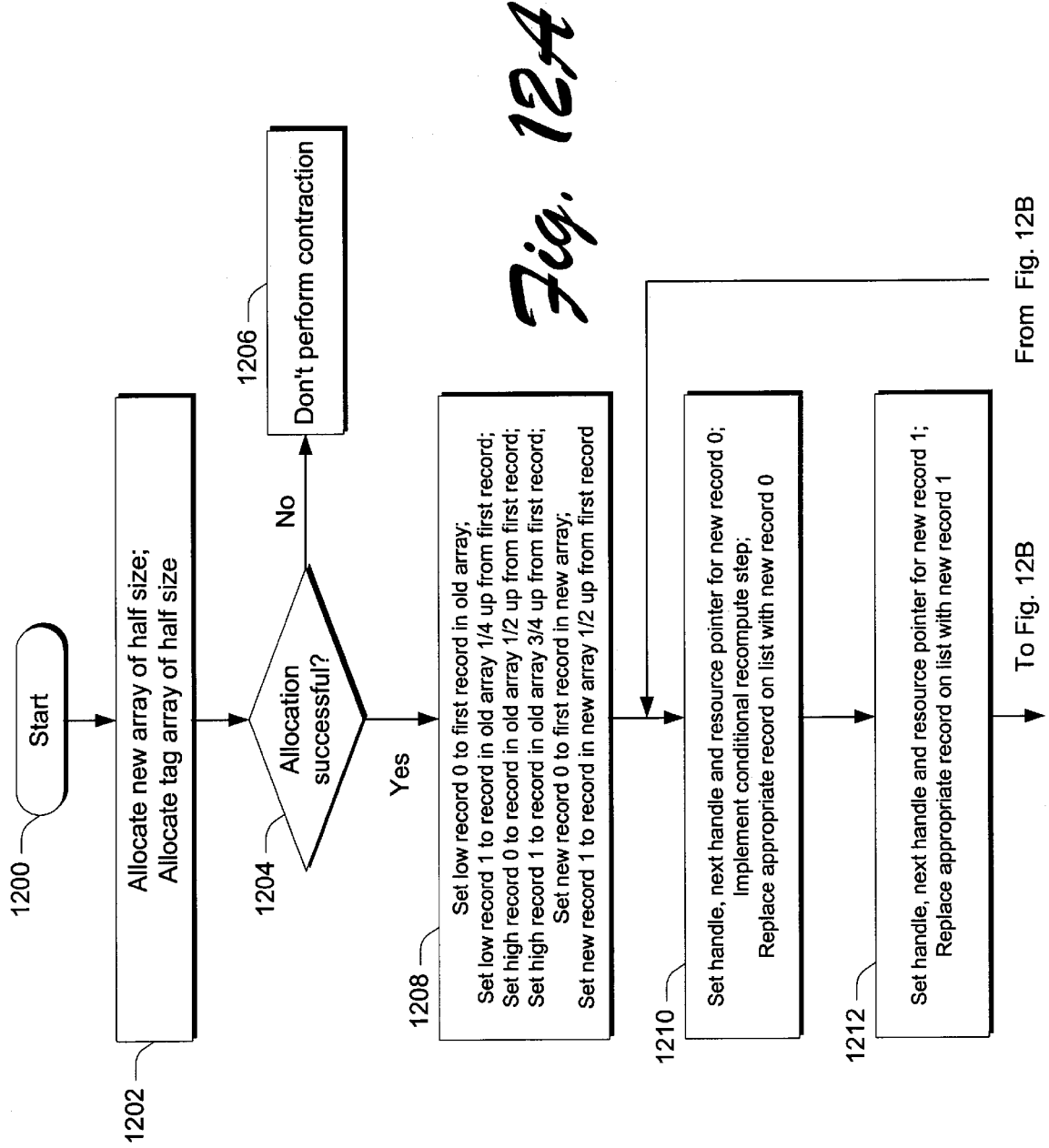
FIGS. 12A and 12B are flow diagrams illustrating the contraction sub-routine of the release routine of the present described embodiments.
Figure 12B:
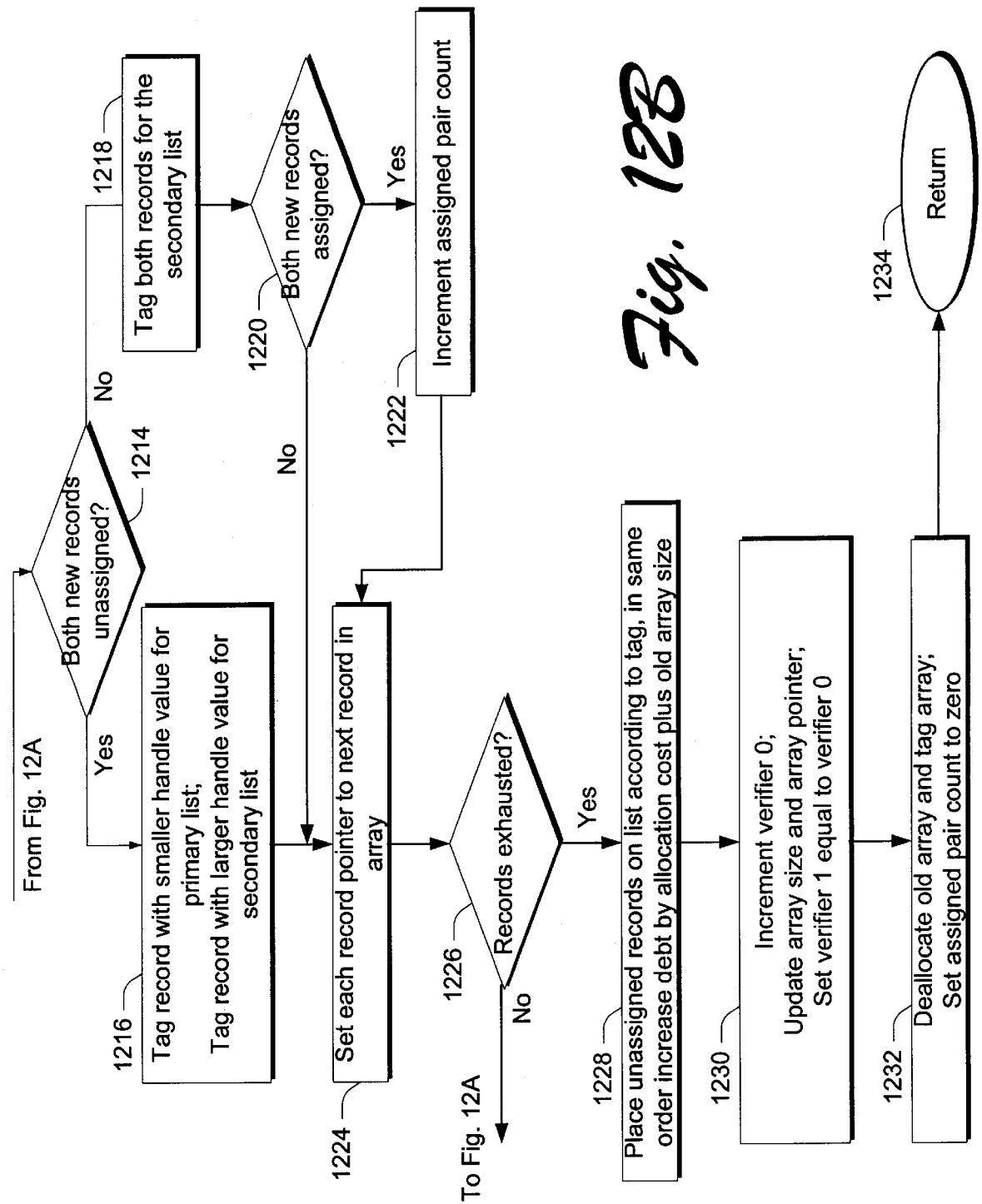

FIGS. 12A and 12B are flow diagrams illustrating the contraction sub-routine of the assignment and release routines of the present described embodiments. The function starts (box 1200), and then a new array of half size of the previous array is allocated, and a tag array of this same size is allocated (box 1202). It is then determined if the allocations were successful (box 1204). If either allocation was not successful, the contraction sub-routine is terminated and contraction is not performed (box 1206). If the allocations were successful, then a low record 0 variable is set to the first record in the old array, a low record 1 variable is set to the record in the old array ¼ up from the first record, a high record 0 variable is set to the record in the old array ½ up from the first record, a high record 1 variable is set to the record in the old array ¾ up from the first record, a new record 0 variable is set to the first record in the new array, and a new record 1 variable is set to the record in the new array ½ up from the first record (box 1208). The handle, the next handle, and the resource pointer are then set for new record 0, a conditional recompute step is implemented on the next handle, and the appropriate record on the list is replaced with the new record 0 (box 1210), as illustrated in detail in FIG. 13. Next, the handle, the next handle, and the resource pointer are set for new record 1 (for a reserved handle value of zero, no conditional recompute step is necessary here because handle 1 is, by definition, in the second or fourth quarter of the table and thus guaranteed not to have a handle value of zero), and the appropriate record on the list is replaced with the new record 1 (box 1212), as illustrated in detail in FIG. 13. It is then determined whether both new records are unassigned (box 1214). If both new records are unassigned, then the record with the smaller handle value is tagged for the primary list and the record with the larger handle value is tagged for the secondary list (box 1216). If at least one new record is assigned, then both records are tagged for the secondary list (box 1218), although only the unassigned record will actually be placed on the secondary list by subsequent steps in the routine. It is then determined whether both new records are assigned (box 1220). If both new records are assigned, then the assigned pair count is incremented (box 1222). If either both new records have not been assigned (box 1220) or after the record with the larger handle value is tagged for the secondary list (box 1216) or after the assigned pair count is incremented (box 1222), each record pointer is set to the next record in the array (box 1224). Next, it is determined whether all records have been exhausted (box 1226). If the records have not been exhausted, the routine cycles through the steps in boxes 1210–1224. If however, the records are exhausted, each unassigned record is placed on the list for which it has been tagged, in the same order as the current unassigned list. The debt is increased by the memory allocation cost plus the old array size (box 1228). Next, verifier 0 is incremented, the array size and array pointer are updated, and verifier 1 is set equal to verifier 0 (box 1230). The old array and tag array are then deallocated, and the assigned pair count is set to zero (box 1232). The sub-routine then returns (box 1234).

Figure 13:
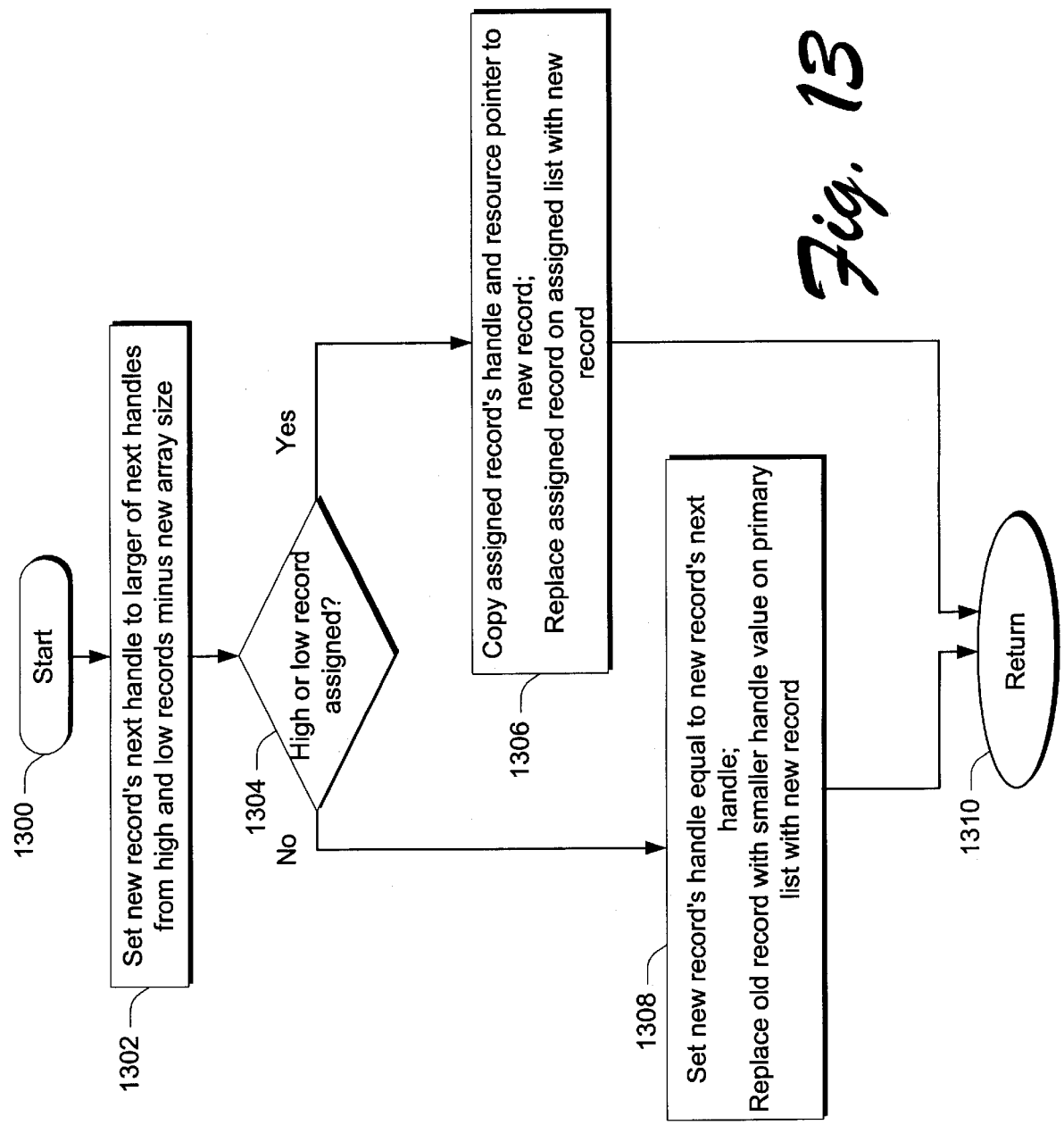
FIG. 13 is a flow diagram illustrating the record updating sub-routine of the contraction sub-routine of the present described embodiments.

FIG. 13 is a flow diagram illustrating the record updating sub-routine of the contraction sub-routine of FIGS. 12A and 12B. The function starts (box 1300) and then the new record's next handle is set to the larger of next handles from high and low records minus the new array size (box 1302). Next, it is determined whether the high or low record has been assigned (box 1304). If the high or low record has been assigned, then the assigned record's handle and resource pointer are copied to the new record, and the assigned record on the assigned list is replaced with the new record (box 1306). If, however, the high or low record has not been assigned, the new record's handle is set equal to the new record's next handle, and the old record with the smaller handle value on the primary list is replaced with the new record (box 1308). After either the assigned record on the assigned list is replaced with the new record (box 1306) or the old record with the smaller handle value on the primary list is replaced with the new record (box 1308), the sub-routine returns (box 1310).

Figure 14:
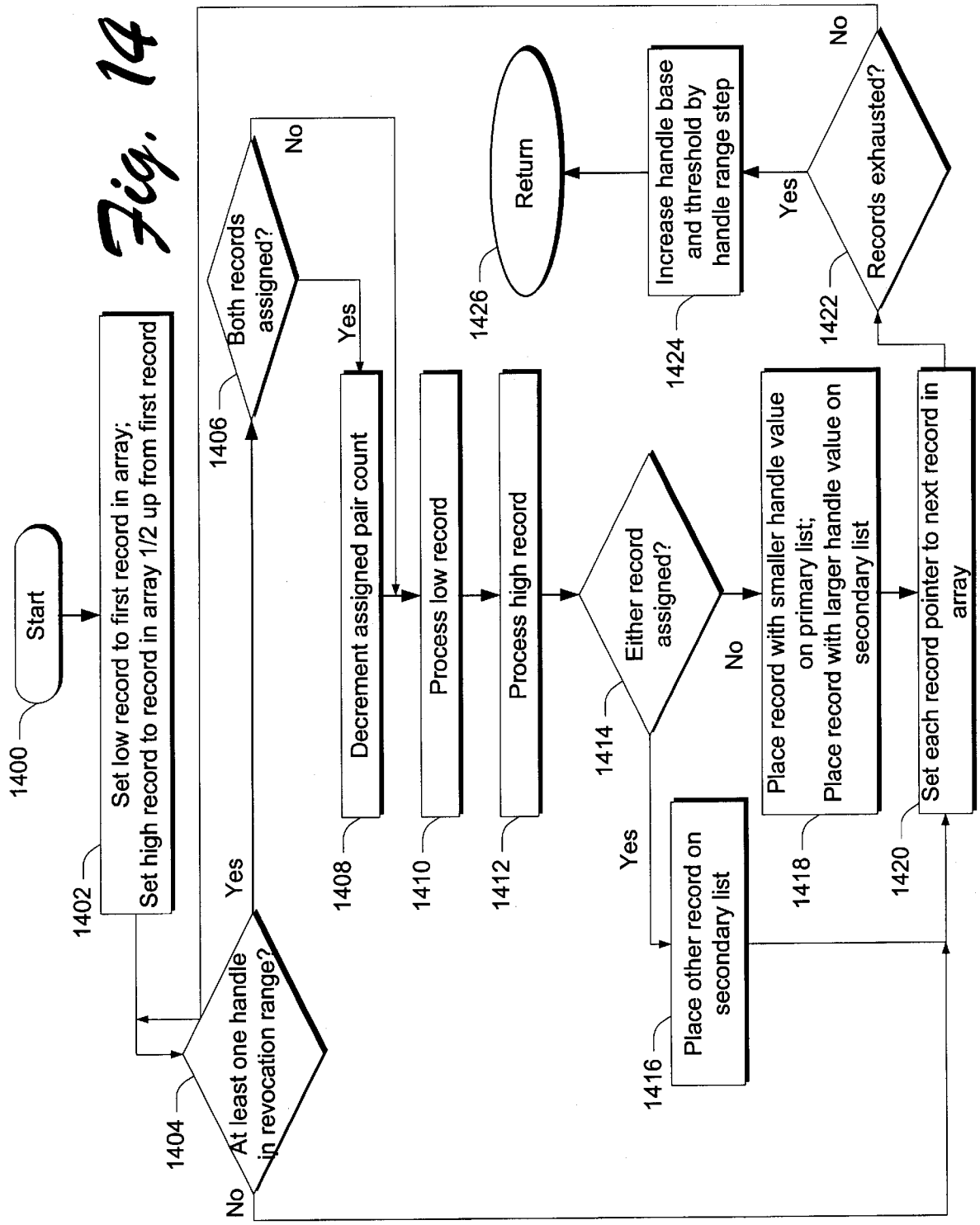
FIG. 14 is a flow diagram illustrating the revoke ancient handles sub-routine of the expansion sub-routine of the present described embodiments.

FIG. 14 is a flow diagram illustrating the revoke ancient handles sub-routine of the assignment sub-routine of the present described embodiments. The function starts (box 1400), and then a low record variable is set to the first record in the array, and a high record variable is set to the record in the array ½ up from the first record (box 1402). Next, it is determined whether there is at least one handle in the revocation range (box 1404). The revocation range begins at the handle base, and the size of the revocation range is equal to the handle range step. If at least one handle is in the revocation range, then it is determined whether both records are assigned (box 1406). If both records are assigned, then the assigned pair count is decremented (box 1408). If both records are not assigned or after the assigned pair count is decremented (box 1408), the low record (box 1410) and the high record (box 1412) are each processed in accordance with the steps of FIG. 15. It will be appreciated that when processing the high record, for a reserved handle value of zero, the conditional recomputation step of box 1514 can be omitted, since the high record is, by definition, in the second half of the table and thus guaranteed not to have a handle value of zero. Next, it is determined whether either record is assigned (box 1414). If either record has been assigned (box 1414), the other record is placed on the secondary list (box 1416). If either record has not been assigned, the record with the smaller handle value is placed on the primary list and the record with the larger value is placed on the secondary list (box 1418). After either the other record is placed on the secondary list (box 1416), the record with the larger handle is placed on the secondary list (box 1418), or if at least one handle is not in the revocation range (box 1404), each record pointer is set to the next record in the array (box 1420). Next, it is determined whether all records have been exhausted (box 1422). If the records have been not exhausted, the above routine is processed again (boxes 1404–1420). When the records are exhausted, the handle database and threshold are increased by the handle range step (box 1424) and then the sub-routine returns (box 1426).

FIG. 15 is a flow diagram illustrating the record processing sub-routine of the revoke ancient handles sub-routine of FIG. 14. The function starts (box 1500), and then it is determined whether the record is unassigned or in the revocation range (box 1502). If the record is unassigned or in the revocation range, the record is removed from the list (box 1504). If the record is assigned or is not in the revocation range (box 1502) or after the record is removed from the list (box 1504), it is determined whether the record handle is in the revocation range (box 1506). If the record is not in the revocation range, the routine is terminated (box 1508). If the record is in the revocation range, it is determined whether the record has been assigned (box 1510). If the record has been assigned, the population is decremented (box 1512). If the record was not assigned (box 1510) or after the population is decremented, the record's next handle value is increased to the base value plus the handle range step plus the index of the record, unless it is already greater, a conditional recompute step is implemented for the record's next handle value, and the handle value is set equal to the next handle value (box 1514). The sub-routine then returns (box 1516).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-implemented method for managing data access to at least one resource of a computer system, said method comprising:

allocating an area in computer readable memory for an original handle database containing at least one reference handle;

reserving a handle value that is never to be issued, the reserved handle value being reserved for an indication of a lack of a valid handle;

issuing a new handle that does not correspond to the reserved handle value to a consumer when said consumer requires access to at least one of the resources;

associating said issued handle with said resource requiring access by assigning a unique value to said issued handle;

verifying that said issued handle is valid;

dereferencing said verified handle in constant time into a pointer to said resource requiring access;

releasing issued handles and deeming their respective handle values as being unassigned for handles that are no longer required by consumers and classifying said released handles as invalid; and wherein said method generates and validates handles for providing efficient management and administration of consumers' access to resources in computer systems.

2. The method of claim 1, further comprising managing assigned and unassigned handle values with a set of records, each record containing fields, one field of each record being a handle value field indicating a handle value.

3. The method of claim 2, wherein said managing assigned and unassigned handle values comprises:

maintaining a list of records, wherein the handle value fields of said records indicate unassigned handle values;

selecting a handle value from said list with indicia of unassigned handle values when a new handle is to be issued; and adding a released handle value to said list with indicia of unassigned handles when a handle is released.

4. The method of claim 3, wherein said maintained list is a linked list, wherein issued handles are assigned previously unassigned handle values from records at a head portion of said list and wherein released handles values are placed in records at a tail portion of said list.

5. The method of claim 3, wherein said maintained list is a search tree and wherein an unassigned handle value with the lowest handle value among all unassigned handle values is selected first to be assigned to an issued handle.

6. The method of claim 1, further comprising dynamically expanding said original handle database in response to predefined conditions.

7. The method of claim 6, wherein said dynamically expanding the original handle database comprises:

allocating an area in said computer readable memory for an expanded handle database having a size of a multiplicative constant larger than said original handle database size;

copying data located in said original handle database into said expanded handle database;

conditionally recomputing data copied into said expanded handle database;

reorganizing said copied data in said expanded handle database so as to prevent a future conflict in handle values; and deallocating said area in said computer readable memory occupied by said original handle database.

8. The method of claim 7, wherein said multiplicative constant is two.

9. The method of claim 1, furthering comprising recycling handle values.

10. The method of claim 1, further comprising dynamically contracting said original handle database by:

allocating an area in said computer readable memory for a contracted handle database half the size of said original handle database size;

copying data located in said original handle database into said contracted handle database;

conditionally recomputing data copied into said contracted handle database;

reorganizing said copied data in said contracted handle database so as to prevent a future conflict in handle values; and deallocating said area in said computer readable memory occupied by said original handle database.

11. The method of claim 10, further comprising dynamically expanding the original handle database by:

allocating an area in said computer readable memory for an expanded handle database having a size of a multiplicative constant larger than said original handle database size;

copying data located in said original handle database into said expanded handle database;

conditionally recomputing data copied into said expanded handle database;

reorganizing said copied data in said expanded handle database so as to prevent a future conflict in handle values; and deallocating said area in said computer readable memory occupied by said original handle database.

12. The method of claim 11, further comprising probabilistically contracting said handle database by:

maintaining a computational debt value;

initially setting said computational debt value to zero;

increasing said computational debt value by a predetermined expansion value each time said handle database is expanded;

increasing said computational debt value by a predetermined contraction value each time said handle database is contracted;

decreasing said computational debt value by a predetermined issue value each time a handle is issued;

decreasing said computational debt value by a predetermined release value each time a handle is release; and contracting said handle database only if said computational debt is equal to zero.

13. The method of claim 6, further comprising revoking at least one handle when said handle database cannot be dynamically expanded.

14. The method of claim 13, wherein said revoking at least one handle comprises:

placing an issued handle in a record at a tail portion of an assigned list each time it is issued;

removing a record from said assigned list when said handle indicated by a field in said record is released; and revoking a handle in response to predefined conditions and removing a record containing a field that indicates the handle being revoked from a head portion of said assigned list.

15. The method of claim 1, further comprising:

preventing simultaneous issuing of new handles with a multithread lock; and preventing simultaneous releasing of issued handles with said multithread lock.

16. A management device for managing data access to a plurality of resources stored on computer readable memory of a computer system, said management device comprising:

an original handle database stored in the computer readable memory of the computer system and containing a plurality of reference handles;

a handle value that is reserved and is never to be issued, the reserved handle value being reserved for an indication of a lack of a valid handle;

a plurality of consumers randomly requiring access to said resources; and a handle administrator comprising, an assignment module for issuing a new handle that does not correspond to the reserved handle value from said original handle database to a requesting consumer when said requesting consumer requires access to a specified resource and for associating said issued handle with said specified resource by assigning a unique value to said issued handle, a dereference module for verifying that said issued handle is valid and for dereferencing said issued handle in constant time into a pointer to said specified resource, and a release module for releasing issued handles and deeming their respective handle values as being unassigned for handles that are no longer required by consumers and classifying said released handles as invalid.

17. The management device of claim 16, wherein said assignment module further comprises an auxiliary sub-module for managing assigned and unassigned handle values with a set of records, each record containing fields, one field of each record being a handle value field indicating a handle value.

18. The management device of claim 17, wherein said auxiliary sub-module comprises:

a list of records, wherein the handle value fields of said records indicate unassigned handle values;

a device for selecting a handle value from said list with indicia of unassigned handle values when a new handle is to be issued; and a device for adding a released handle value to said list with indicia of unassigned handle values when a handle is released.

19. The management device of claim 18, wherein said list is a linked list and wherein handle values are selected from records at a head portion of said list when issued and are placed in records at a tail portion of said list when released.

20. The management device of claim 18, wherein said list is a search tree and wherein handle values with the lowest handle value among unassigned handle values are selected first when issued.

21. The management device of claim 16, further comprising an expansion sub-module for dynamically expanding said handle database in response to predefined conditions.

22. The management device of claim 21, wherein said expansion sub-module comprises:

a allocate routine for allocating an area in said computer readable memory for an expanded handle database having a size of a multiplicative constant larger than said original handle database size;

a copy routine for copying data located in said original handle database into said expanded handle database;

a conditional recomputation routine for conditionally recomputing data copied into said expanded handle database;

a reorganize routine for reorganizing said copied data in said expanded handle database so as to prevent a future conflict in handle values; and a deallocate routine for deallocating said area in said computer readable memory occupied by said original handle database.

23. The management device of claim 22, wherein said multiplicative constant is two.

24. The management device of claim 16, further comprising a recycle handle values sub-module adapted for efficiently recycling handle values.

25. The management device of claim 24, wherein said recycle handle values sub-module is user activateable.

26. The management device of claim 16, further comprising a contraction module for dynamically contracting said original handle database in response to predefined conditions by:

an allocate routine for allocating an area in said computer readable memory for a contracted handle database half the size of said original handle database size;

a copy routine for copying data located in said original handle database into said contracted handle database;

a conditional recomputation routine for conditionally recomputing data copied into said contracted handle database;

a reorganize routine for reorganizing said copied data in said contracted handle database so as to prevent a future conflict in handle values; and a deallocate routine for deallocating said area in said computer readable memory occupied by said original handle database.

27. The management device of claim 26, wherein said assignment module further comprises an expansion sub-module for dymanically expanding said original handle database, said expansion module comprising:

an allocate routine for allocating an area in said computer readable memory for an expanded handle database having a size of a multiplicative constant larger than said original handle database size;

a copy routine for copying data located in said original handle database into said expanded handle database;

a conditional recomputation routine for conditionally recomputing data copied into said expanded handle database;

a reorganize routine for reorganizing said copied data in said expanded handle database so as to prevent a future conflict in handle values; and a deallocate routine for deallocating said area in said computer readable memory occupied by said original handle database.

28. The management device of claim 27, further comprising a hysteresis sub-module for probabilistically contracting said handle database, said hysteresis sub-module comprising:

a maintain routine for maintaining a computational debt value;

a set routine for initially setting said computational debt value to zero;

a first increase routine for increasing said computational debt value by a predetermined expansion value each time said handle database is expanded;

a second increase routine for increasing said computational debt value by a predetermined contraction value each time said handle database is contracted;

a first decrease routine for decreasing said computational debt value by a predetermined issue value each time a handle is issued;

a second decrease routine for decreasing said computational debt value by a predetermined release value each time a handle is release; and a contract routine for contracting said handle database only if said computational debt is equal to zero.

29. The management device of claim 16, wherein said assignment module further includes a memory allocation failure sub-module for revoking at least one handle when said handle database cannot be expanded.

30. The management device of claim 29, wherein said memory allocation failure sub-module comprises:

a placement routine for placing an issued handle in a record at a tail portion of an assigned list each time it is issued;

a remove routine for removing a record from said assigned list when said handle indicated by a field in said record is released; and a revoke routine for revoking a handle in response to predefined conditions and removing a record containing a field that indicates the handle being revoked from a head portion of said assigned list.

31. A computer readable medium having computer-executable components for causing a computer to function as a resource administration system for generating and validating reference handles for consumers requiring access to a plurality of resources, said system comprising:

a computer-readable storage medium; and a computer data access system stored on said medium, said computer data access system having a handle administrator and an original handle database stored in said computer-readable storage medium, said original handle database containing a plurality of reference handles and having a handle value that is reserved and is never to be issued, the reserved handle value being reserved for an indication of a lack of a valid handle;

wherein said computer data access system is preprogrammed for, issuing a new handle having a handle value that is not the reserved handle value from said original handle database to a requesting consumer when said requesting consumer requires access to a specified resource and for associating said issued handle with said specified resource by assigning a unique value to said issued handle, verifying that said issued handle is valid and for dereferencing said issued handle in constant time into a pointer to said specified resource, and releasing issued handles and deeming their respective handle values as being unassigned for handles that are no longer required by consumers and classifying said released handles as invalid.

32. The resource administration system of claim 31, wherein said computer data access system is further preprogrammed for managing assigned and unassigned handle values with a set of records, each record containing fields, one field of each record being a handle value field indicating a handle value.

33. The resource administration system of claim 32, wherein said computer data access system manages assigned and unassigned handle values of said original handle database by:

maintaining a list of records, wherein the handle value fields of said records indicate unassigned handle values;

selecting a handle value from said list with indicia of unassigned handle values when a new handle is to be issued; and adding a released handle value to said list with indicia of unassigned handle values when a handle is released.

34. The resource administration system of claim 33, wherein said list is a linked list and wherein handle values are selected from records at a head portion of said list when issued and are placed in records at a tail portion of said list when released.

35. The resource administration system of claim 33, wherein said list is a search tree and wherein handle values with the lowest handle value among unassigned handle values are selected first when issued.

36. The resource administration system of claim 31, wherein said computer data access system is further preprogrammed for dynamically expanding said handle database in response to predefined conditions.

37. The resource administration system of claim 36, wherein said computer data access system dynamically expands said handle database by:

allocating an area in said computer readable memory for an expanded handle database having a size of a multiplicative constant larger than said original handle database size;

copying data located in said original handle database into said expanded handle database;

conditionally recomputing data copied into said expanded handle database;

reorganizing said copied data in said expanded handle database so as to prevent a future conflict in handle values; and deallocating said area in said computer readable memory occupied by said original handle database.

38. The resource administration system of claim 37, wherein said multiplicative constant is two.

39. The resource administration system of claim 31, wherein said computer data access system is further preprogrammed for recycling handle values.

40. The resource administration system of claim 39, wherein said recycling of handle values is user activateable.

41. The resource administration system of claim 31 further comprising a contraction module for dynamically contracting the original handle database in response to predefined conditions by:

allocating an area in said computer readable memory for a contracted handle database half the size of said original handle database size;

copying data located in said original handle database into said contracted handle database;

conditionally recomputing data copied into said contracted handle database;

reorganizing said copied data in said contracted handle database so as to prevent a future conflict in handle values; and deallocating said area in said computer readable memory occupied by said original handle database.

42. The resource administration system of claim 41, wherein said computer data access system is further preprogrammed for dynamically expanding said original handle database by:

allocating an area in said computer readable memory for an expanded handle database having a size of a multiplicative constant larger than said original handle database size;

copying data located in said original handle database into said expanded handle database;

conditionally recomputing data copied into said expanded handle database;

reorganizing said copied data in said expanded handle database so as to prevent a future conflict in handle values; and deallocating said area in said computer readable memory occupied by said original handle database.

43. The resource administration system of claim 42, wherein said computer data access system is further preprogrammed for probabilistically contracting said handle database by:

maintaining a computational debt value;

initially setting said computational debt value to zero;

increasing said computational debt value by a predetermined expansion value each time said handle database is expanded;

increasing said computational debt value by a predetermined contraction value each time said handle database is contracted;

decreasing said computational debt value by a predetermined issue value each time a handle is issued;

decreasing said computational debt value by a predetermined release value each time a handle is release; and contracting said handle database only if said computational debt is equal to zero.

44. The resource administration system of claim 31, wherein said computer data access system is further preprogrammed for revoking at least one handle when said handle database cannot be expanded.

45. The resource administration system of claim 44, wherein said computer data access system revokes at least one handle by:

placing an issued handle in a record at a tail portion of an assigned list each time it is issued;

removing a record from said assigned list when said handle indicated by a field in said record is released; and revoking a handle in response to predefined conditions and removing a record containing a field that indicates the handle being revoked from a head portion of said assigned list.

* * * * *

UNITED STATES PATENT AND TRADEMARK OFFICE
CERTIFICATE OF CORRECTION

PATENT NO.     : 6,636,874 B1
DATED          : October 21, 2003
INVENTOR(S)    : Douceur et al.

It is certified that error appears in the above-identified patent and that said Letters Patent is hereby corrected as shown below:

<u>Column 12,</u>
Line 16, replace "fill" with -- full --.

<u>Column 21,</u>
Line 47, replace "an" with -- a --.

<u>Column 32,</u>
Line 57, replace "dymanically" with -- dynamically --.

Signed and Sealed this

Second Day of March, 2004

JON W. DUDAS
*Acting Director of the United States Patent and Trademark Office*